US012053983B2

(12) United States Patent
Mori et al.

(10) Patent No.: US 12,053,983 B2
(45) Date of Patent: Aug. 6, 2024

(54) PRINTING APPARATUS, PRINTING METHOD AND NON-TRANSITORY COMPUTER-READABLE MEDIUM STORING PROGRAM REGARDING PRINTING METHOD

(71) Applicant: BROTHER KOGYO KABUSHIKI KAISHA, Nagoya (JP)

(72) Inventors: Masaki Mori, Nagoya (JP); Mikio Hirano, Okazaki (JP)

(73) Assignee: Brother Koygo Kabushiki Kaisha, Nagoya (JP)

( * ) Notice: Subject to any disclaimer, the term of this patent is extended or adjusted under 35 U.S.C. 154(b) by 90 days.

(21) Appl. No.: 17/936,881

(22) Filed: Sep. 30, 2022

(65) Prior Publication Data

US 2023/0100055 A1 Mar. 30, 2023

(30) Foreign Application Priority Data

Sep. 30, 2021 (JP) ................................. 2021-160709

(51) Int. Cl.
*B41J 2/045* (2006.01)
*B41J 2/21* (2006.01)

(52) U.S. Cl.
CPC ....... *B41J 2/04573* (2013.01); *B41J 2/04505* (2013.01); *B41J 2/04563* (2013.01); *B41J 2/0458* (2013.01); *B41J 2/2132* (2013.01); *B41J 2/2121* (2013.01)

(58) Field of Classification Search
CPC .......................... B41J 2/04573; B41J 2/04563
See application file for complete search history.

(56) References Cited

U.S. PATENT DOCUMENTS

| | | | | |
|---|---|---|---|---|
| 9,862,187 B1 * | 1/2018 | Mu | B41J 2/04591 | |
| 2005/0264609 A1 * | 12/2005 | Kubo | B41J 2/1752 | 347/54 |
| 2008/0143775 A1 * | 6/2008 | Shihoh | B41J 2/0454 | 347/17 |
| 2013/0155142 A1 * | 6/2013 | Browning | B41J 2/14153 | 347/19 |
| 2016/0107435 A1 * | 4/2016 | Gracia Verdugo | B41J 2/04563 | 347/14 |
| 2021/0362491 A1 * | 11/2021 | Anderson | B41J 2/04586 | |
| 2021/0402761 A1 * | 12/2021 | Martin | B41J 2/04546 | |

FOREIGN PATENT DOCUMENTS

JP 2009-297968 A 12/2009

* cited by examiner

*Primary Examiner* — Shelby L Fidler
(74) *Attorney, Agent, or Firm* — Scully, Scott, Murphy & Presser, PC

(57) ABSTRACT

There is provided a printing apparatus including: a head having nozzles aligned in a first direction, a manifold, and a driving element; a first temperature sensor configured to detect, in the manifold, a temperature difference between a temperature of the ink at an upstream in the first direction and a temperature of the ink at a downstream in the first direction; and a controller. The nozzles have a first nozzle and a second nozzle. The controller is configured to execute: causing of the head to perform printing, and performing of position correction of correcting a discharge timing of the ink from the nozzles based on the temperature difference so that a distance between a landing position of the ink discharged from the first nozzle and a landing position of the ink discharged from the second nozzle becomes short in a second direction crossing the first direction.

20 Claims, 24 Drawing Sheets

FIG. 10

| | TEMPERATURE DIFFERENCE OF INK (°C) | | | | | | |
|---|---|---|---|---|---|---|---|
| | | 0 | 1 | 2 | 3 | 4 | 5 |
| ENVIRONMENTAL TEMPERATURE (°C) | NOT LESS THAN 0 AND LESS THAN 5 | 0 | 2 | 3 | 3 | 4 | 5 |
| | NOT LESS THAN 5 AND LESS THAN 10 | 0 | 2 | 2 | 3 | 3 | 4 |
| | NOT LESS THAN 10 AND LESS THAN 15 | 0 | 1 | 2 | 2 | 3 | 3 |
| | NOT LESS THAN 15 AND LESS THAN 20 | 0 | 1 | 1 | 2 | 2 | 3 |
| | NOT LESS THAN 20 AND LESS THAN 25 | 0 | 0 | 1 | 1 | 2 | 2 |
| | NOT LESS THAN 25 AND LESS THAN 30 | 0 | 0 | 0 | 1 | 1 | 2 |
| | NOT LESS THAN 30 AND LESS THAN 35 | 0 | 0 | 0 | 0 | 1 | 1 |
| | NOT LESS THAN 35 AND LESS THAN 40 | 0 | 0 | 0 | 0 | 0 | 1 |

FIG. 11

| | TEMPERATURE DIFFERENCE OF INK (°C) | | | | | | |
|---|---|---|---|---|---|---|---|
| | | 0 | 1 | 2 | 3 | 4 | 5 |
| NOZZLE | 1-9 | 0 | 0 | 0 | 0 | 0 | 0 |
| | 10-19 | 0 | 0 | 0 | 1 | 1 | 1 |
| | 20-29 | 0 | 0 | 0 | 1 | 1 | 2 |
| | 30-39 | 0 | 0 | 1 | 1 | 2 | 2 |
| | 40-49 | 0 | 1 | 1 | 2 | 2 | 3 |
| | 50-59 | 0 | 1 | 2 | 2 | 3 | 3 |
| | 60-69 | 0 | 2 | 2 | 3 | 3 | 4 |
| | 70-79 | 0 | 2 | 3 | 3 | 4 | 4 |

FIG. 15

| | | TEMPERATURE DIFFERENCE OF INK (°C) | | | | |
|---|---|---|---|---|---|---|
| | | 0 | 1 | 2 | 3 | 4 |
| NOZZLE | 1-9 | 0 | 0 | 0 | 0 | 0 |
| | 10-19 | 0 | 0 | 0 | 0 | 1 |
| | 20-29 | 0 | 0 | 0 | 1 | 1 |
| | 30-39 | 0 | 0 | 1 | 1 | 1 |
| | 40-49 | 0 | 1 | 1 | 1 | 2 |
| | 50-59 | 0 | 1 | 1 | 2 | 2 |
| | 60-69 | 0 | 1 | 2 | 2 | 3 |
| | 70-79 | 0 | 1 | 2 | 3 | 3 |

FIG. 21

| | TEMPERATURE DIFFERENCE OF INK (°C) | | | | | |
|---|---|---|---|---|---|---|
| | | 0 | 1 | 2 | 3 | 4 |
| NOZZLE | 1-9 | 0 | 1 | 2 | 2 | 3 |
| | 10-19 | 0 | 1 | 1 | 2 | 2 |
| | 20-29 | 0 | 0 | 1 | 1 | 1 |
| | 30-39 | 0 | 0 | 0 | 0 | 0 |
| | 40-49 | 0 | 0 | 0 | 0 | 0 |
| | 50-59 | 0 | 0 | 1 | 1 | 1 |
| | 60-69 | 0 | 1 | 1 | 2 | 2 |
| | 70-79 | 0 | 1 | 2 | 2 | 3 |

FIG. 23

| | TEMPERATURE DIFFERENCE OF INK (°C) | | | | | |
|---|---|---|---|---|---|---|
| | | 0 | 1 | 2 | 3 | 4 |
| NOZZLE | 1-9 | 0 | 2 | 3 | 3 | 4 |
| | 10-19 | 0 | 2 | 2 | 3 | 3 |
| | 20-29 | 0 | 1 | 2 | 2 | 3 |
| | 30-39 | 0 | 1 | 1 | 2 | 2 |
| | 40-49 | 0 | 1 | 1 | 2 | 2 |
| | 50-59 | 0 | 0 | 1 | 1 | 1 |
| | 60-69 | 0 | 0 | 0 | 1 | 1 |
| | 70-79 | 0 | 0 | 0 | 0 | 0 |

FIG. 24

| | TEMPERATURE DIFFERENCE OF INK (°C) | | | | | |
|---|---|---|---|---|---|---|
| | | 0 | 1 | 2 | 3 | 4 |
| NOZZLE | 1-9 | 0 | 0 | 0 | 0 | 0 |
| | 10-19 | 0 | 0 | 0 | 0 | 1 |
| | 20-29 | 0 | 0 | 0 | 1 | 1 |
| | 30-39 | 0 | 0 | 1 | 1 | 1 |
| | 40-49 | 0 | 1 | 1 | 1 | 2 |
| | 50-59 | 0 | 1 | 1 | 2 | 2 |
| | 60-69 | 0 | 1 | 2 | 2 | 3 |
| | 70-79 | 0 | 1 | 2 | 3 | 3 |

FIG. 26

| ENVIRONMENTAL TEMPERATURE (°C) | MAGNIFICATION |
|---|---|
| LESS THAN 5 | 1.5 |
| NOT LESS THAN 5 AND LESS THAN 15 | 1.3 |
| NOT LESS THAN 15 AND LESS THAN 25 | 1 |
| NOT LESS THAN 25 AND LESS THAN 35 | 0.5 |
| NOT LESS THAN 35 AND LESS THAN 40 | 0.3 |

PRINTING APPARATUS, PRINTING METHOD AND NON-TRANSITORY COMPUTER-READABLE MEDIUM STORING PROGRAM REGARDING PRINTING METHOD

REFERENCE TO RELATED APPLICATIONS

This application claims priority from Japanese Patent Application No. 2021-160709 filed on Sep. 30, 2021. The entire content of the priority application is incorporated herein by reference.

BACKGROUND ART

As a conventional printing apparatus, for example, an image forming apparatus is known. A certain image forming apparatus is provided with a recording head which discharges or ejects a liquid, a carriage which moves the recording head reciprocally, and a tank which supplies the liquid to the recording head; and the recording head has a pressure generating mechanism which applies a pressure for discharging the liquid. In such an image forming apparatus, the liquid is discharged from the recording head onto a recording medium while moving the recording head reciprocally, thereby causing the liquid to land on the recording medium and to form an image on the recording medium.

DESCRIPTION

In such an image forming apparatus, accompanying with the driving of the pressure generating mechanism in a case of forming the image, the liquid in the recording head is heated by the heat generated by the pressure generating mechanism. On the other hand, the liquid is supplied to the recording head from the tank. Accordingly, in a channel, in the recording head, in which the liquid flows, the temperature of the liquid becomes higher at the downstream than at the upstream wherein the liquid is supplied from the tank, which in turn generates any difference in the temperature between the downstream and the upstream. As the temperature of the liquid is higher, the viscosity of the liquid becomes smaller, which in turn fastens the velocity of the liquid discharged from the recording head, thereby causing a landing position, of the liquid, on the recording medium to be shifted or deviated.

In view of this situation, the above-described image forming apparatus corrects any deviation of the landing position of the liquid discharged from the recording head, based on the difference between an environmental temperature of the apparatus and the temperature of the liquid. This image forming apparatus, however, is not capable of correcting a deviation in the landing position due to the difference in the temperature (temperature difference) of the liquid in the recording head, which in turn leads to any lowering in the quality of the image.

The present disclosure has been made in view of the above-mentioned situation, and an object of the present disclosure is to provide a printing apparatus, a printing method, and a non-transitory computer-readable medium storing a program regarding the printing method which are capable of reducing any lowering of the image quality due to the temperature difference of the liquid in the head.

According to an aspect of the present disclosure, there is provided a printing apparatus including a head, a first temperature sensor and a controller. The head includes a plurality of nozzles aligned in a first direction, a manifold communicating with the plurality of nozzles, and a driving element configured to apply a discharging pressure to an ink. The first temperature sensor is configured to detect, in the manifold, a temperature difference between a temperature of the ink at upstream in the first direction and a temperature of the ink at a downstream in the first direction. The plurality of nozzles includes a first nozzle arranged at the upstream in the first direction, and a second nozzle arranged at the downstream in the first direction. The controller is configured to execute: causing of the head to perform printing of discharging the ink from the plurality of nozzles onto a print medium, based on image data, so as to form an image by the ink landed on the print medium; and performing of position correction of correcting a discharge timing of the ink from the plurality of nozzles based on the temperature difference so that a distance between a landing position of the ink discharged from the first nozzle and a landing position of the ink discharged from the second nozzle becomes short in a second direction crossing the first direction.

According to the present disclosure, it is possible to provide the printing apparatus, the printing method, and the non-transitory, computer-readable medium storing the program for controlling the printing apparatus which are capable of reducing any lowering of the image quality due to the difference in the temperature of the liquid in the head.

FIG. 10 is a table indicating a corresponding relationship among the temperature difference of the ink, an environmental temperature and the correction value of the discharge timing in a printing apparatus.

FIG. 11 is a table indicating a corresponding relationship among the temperature difference of the ink, orders of nozzles and the correction value of the discharge timing in a printing apparatus.

FIG. 15 is a table depicting a corresponding relationship among the temperature difference of the ink, the orders of the nozzles, and a ratio (correction ratio) of a dot, which is included in the dots and of which discharge amount is to be corrected, in a printing apparatus.

Figure 20A:
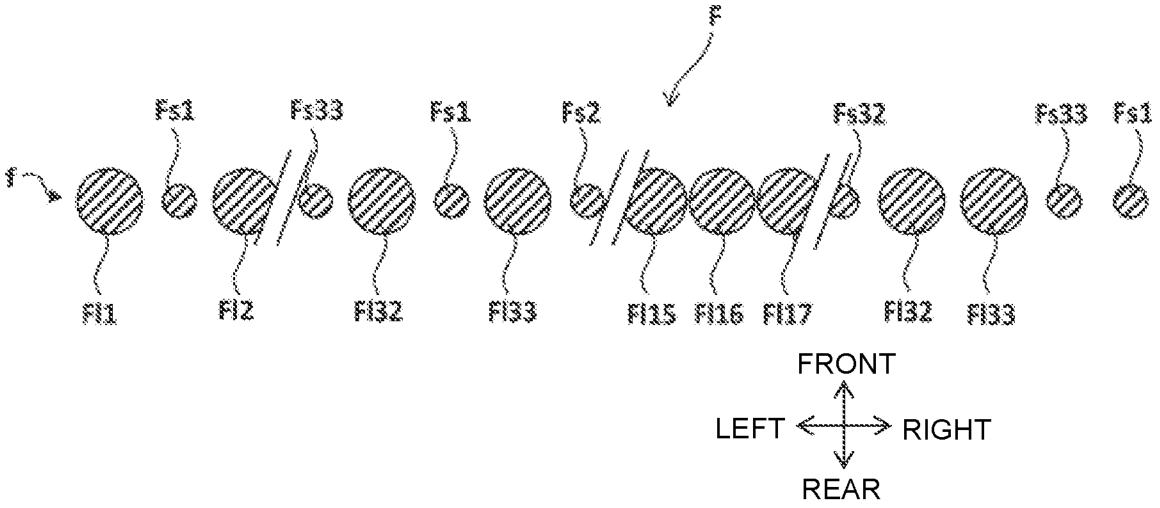
Figure 20B:
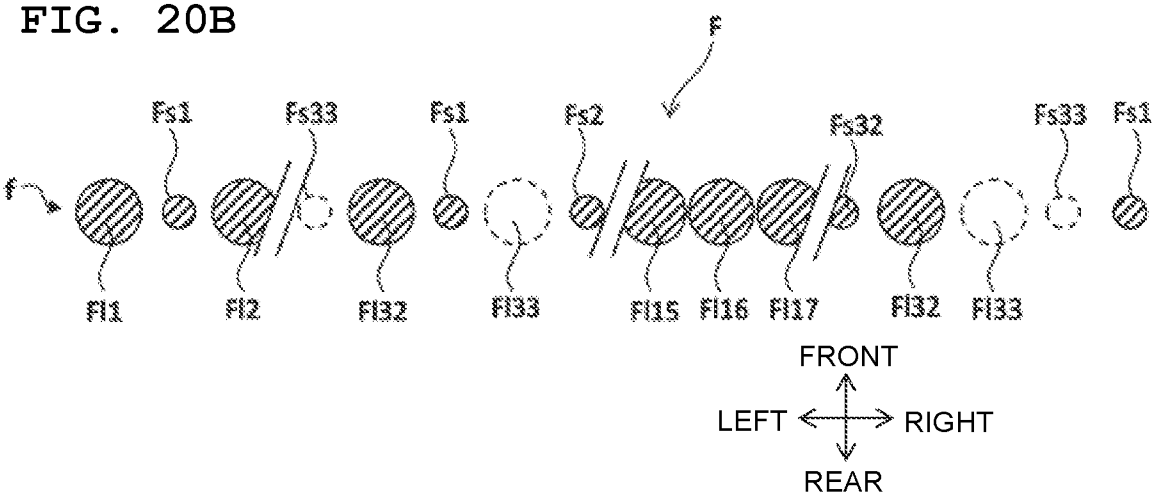
Figure 20C:
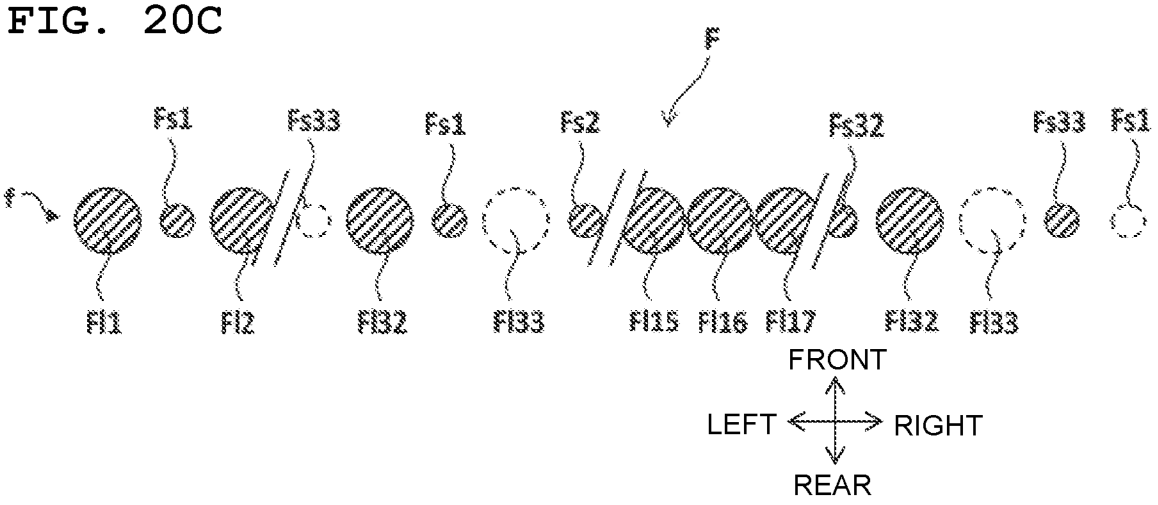

FIG. 20A is a view depicting dot rows of dots based on image data; FIG. 20B is a view depicting dot rows of dots wherein the dots include dots of which discharge amount is corrected to 0 and which are arranged side by side in the left-right direction; and FIG. 20C is a view depicting dot rows of the dots wherein the dots include dots of which discharge amount is corrected to 0 by a printing apparatus.

FIG. 21 is a table indicating a corresponding relationship among the temperature difference of the ink, the orders of the nozzles, and the correction ratio of the discharge amount in a printing apparatus.

Figure 22A:
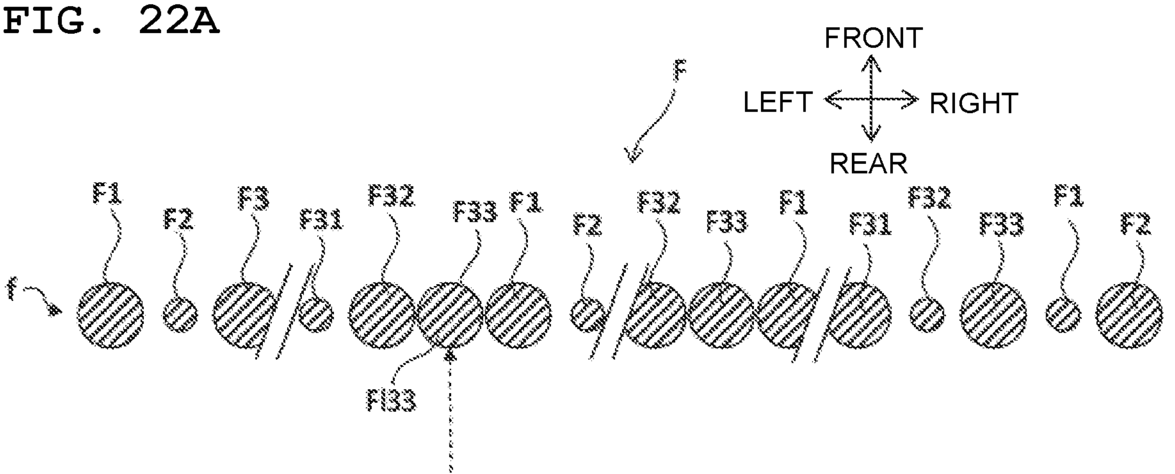
Figure 22B:
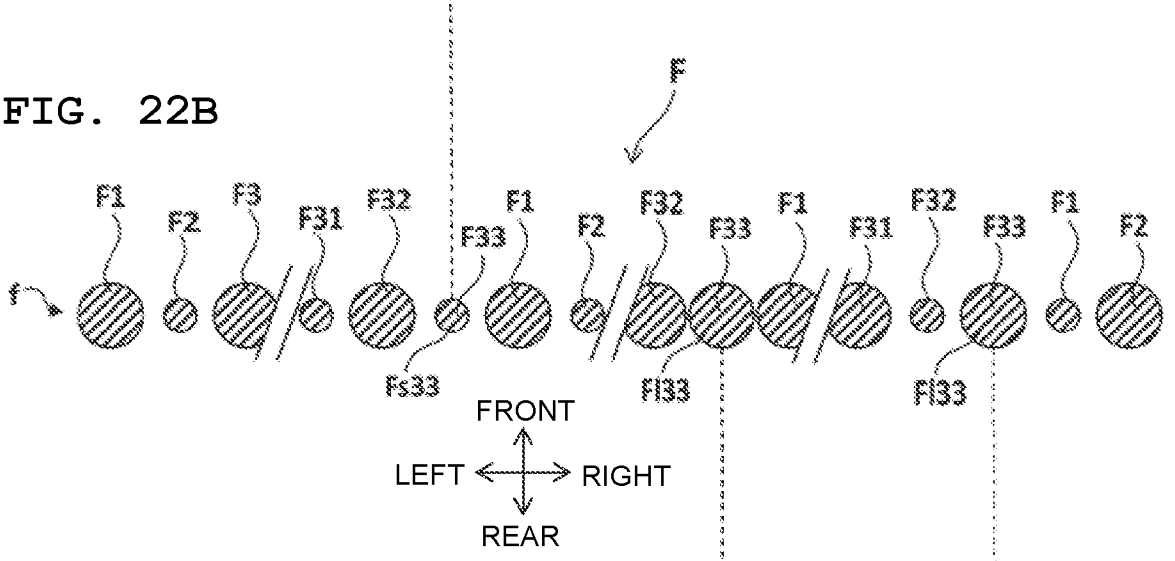
Figure 22C:
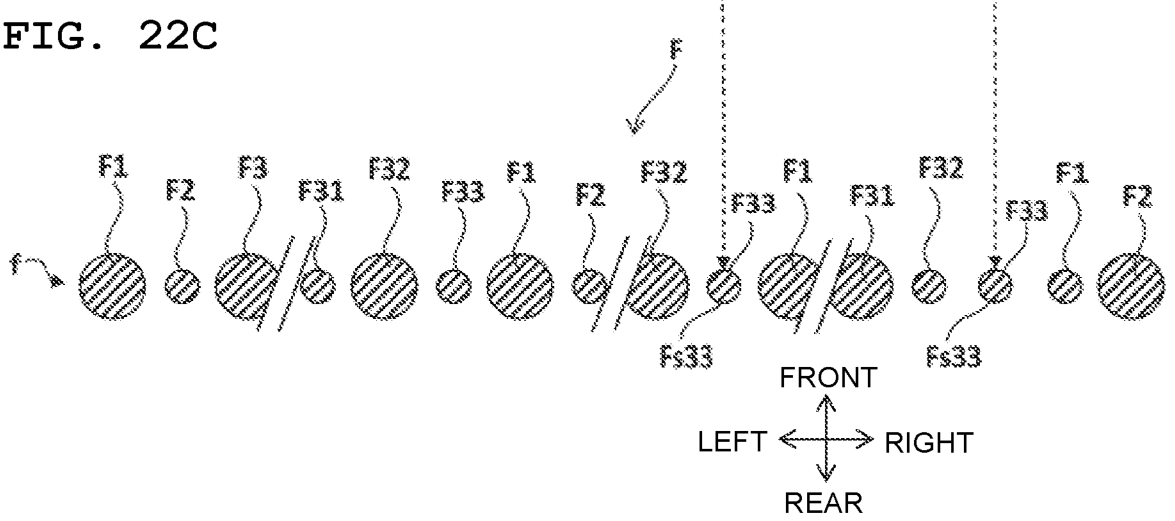

FIG. 22A is a view depicting a dot row of dots in which a correction of increasing the discharge amount of the ink is performed with respect to a dot, included in the dots and which corresponds to the correction ratio of FIG. 21; FIG. 22B is a view depicting a dot row of dots based on the image data; and FIG. 22C is a view depicting a dot row of dots in which a correction of decreasing the discharge amount of the ink is performed with respect to dots, included in the dots and which correspond to the correction ratio of FIG. 21.

FIG. 23 is a table indicating a corresponding relationship among the temperature difference of the ink, the orders of the nozzles, and the correction ratio of the discharge amount in a printing apparatus.

FIG. 24 is a table indicating a corresponding relationship among the temperature difference of the ink, the orders of the nozzles, and the correction ratio of the discharge amount in a printing apparatus.

Figure 25A:
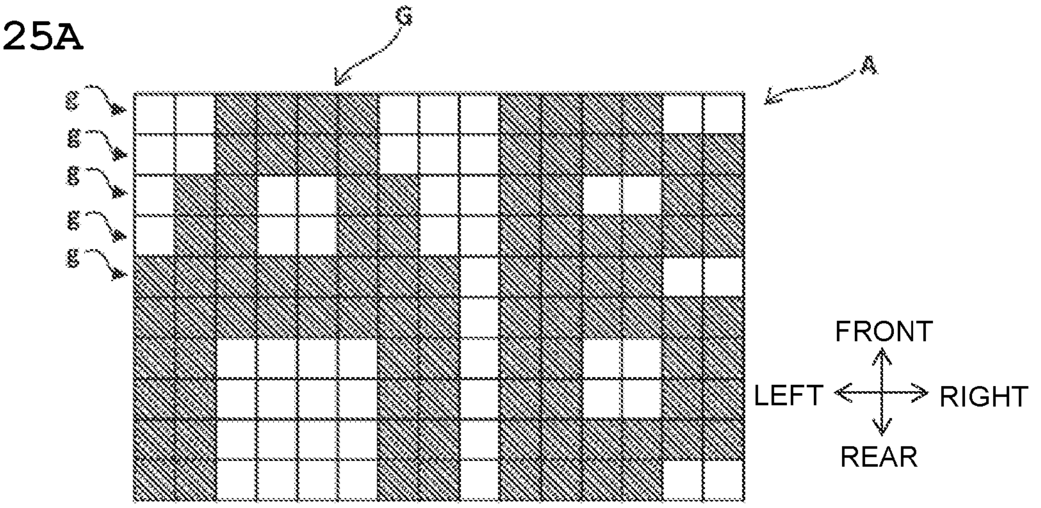
Figure 25B:
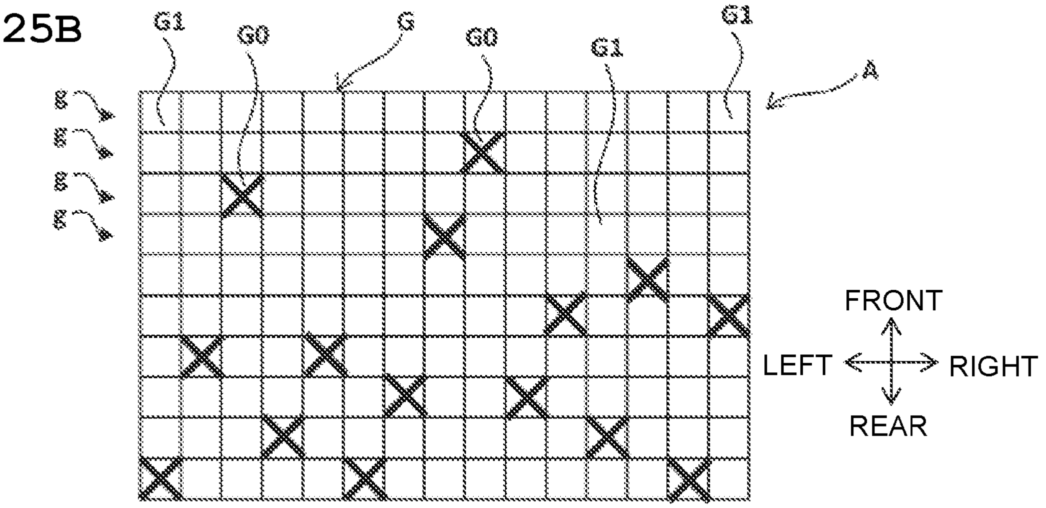
Figure 25C:
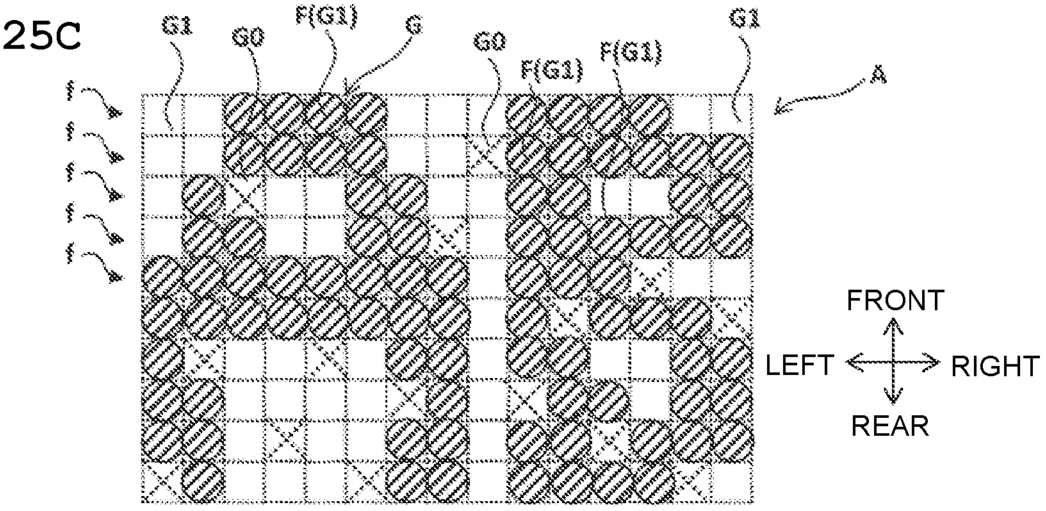

FIG. 25A is a view in which the image data is made to correspond to a print medium; FIG. 25B is a view of a printing medium in which a landing-possible area and a mask area are set by a printing apparatus; and FIG. 25C is a view depicting a print medium in which dots based on the image data are formed in the landing-possible area.

FIG. 26 is a table indicating a corresponding relationship between an environmental temperature and a magnification in a printing apparatus.

In the following, an embodiment of the present disclosure will be specifically described, with reference to the drawings. Note that in the following description, same reference numerals are affixed to same or corresponding elements throughout all the drawings, and any overlapping explanation therefor will be omitted.

First Embodiment

<Configuration of Printing Apparatus>

Figure 1:
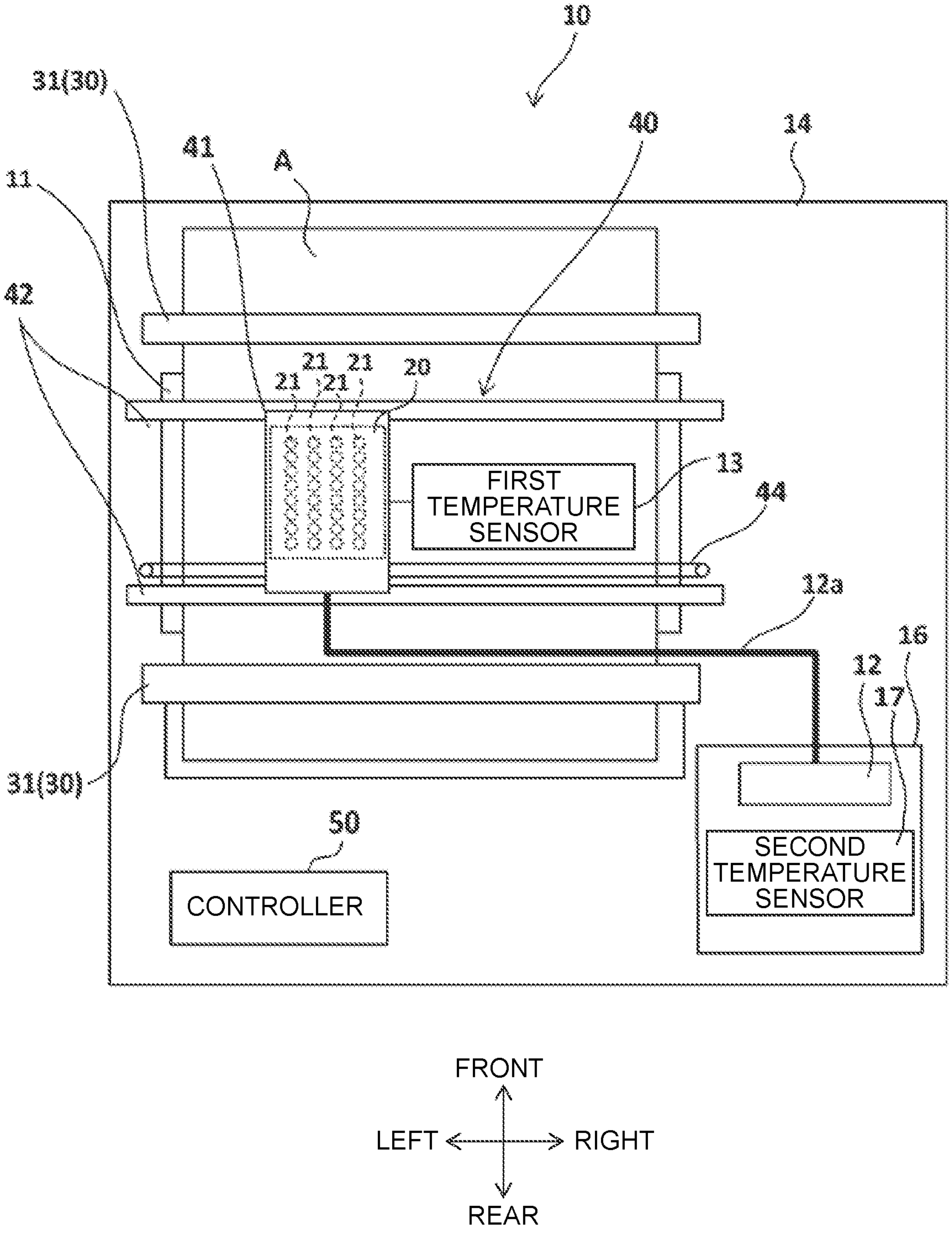
FIG. 1 is a view depicting the schematic configuration of a printing apparatus.

A printing apparatus 10 according to a first embodiment of the present disclosure is an apparatus which discharges or ejects an ink from a plurality of nozzles 21 of a head 20 onto a print medium A so as to print an image on the print medium A with the ink, as depicted in FIG. 1. In the following, although an explanation will be given about a case wherein the printing apparatus 10 is applied to an ink-jet printer, the printing apparatus 10 is not limited to or restricted by this. Further, the print medium A is a sheet such as paper, cloth (fabric), etc.

The printing apparatus 10 is of the serial head system and is provided with a head 20, a platen 11, a conveyor 30, a scanning device 40, an ink cartridge 12, a first temperature sensor 13, a casing 14 and a controller 50. Note that a first direction in which the plurality of nozzles 21 are aligned is referred to as a front-rear direction, and a second direction crossing (for example, orthogonal to) the first direction is referred to as a left-right direction. Further, a direction crossing (for example, orthogonal to) the first and second directions is referred to as an up-down direction. Note, however, that the arrangement of the printing apparatus 10 is not limited to this. Furthermore, the details of the head 20, the first temperature sensor 13 and the controller 50 will be described later on.

The casing 14 accommodates the head 20, the platen 11, the conveyor 30, the scanning device 40, the ink cartridge 12, the first temperature sensor 13 and the controller 50. The platen 11 has a flat upper surface, and determines a distance between the print medium A arranged or placed on the upper surface and the lower surface, of the head 20, which is arranged to face or be opposite to the upper surface.

Figure 2:
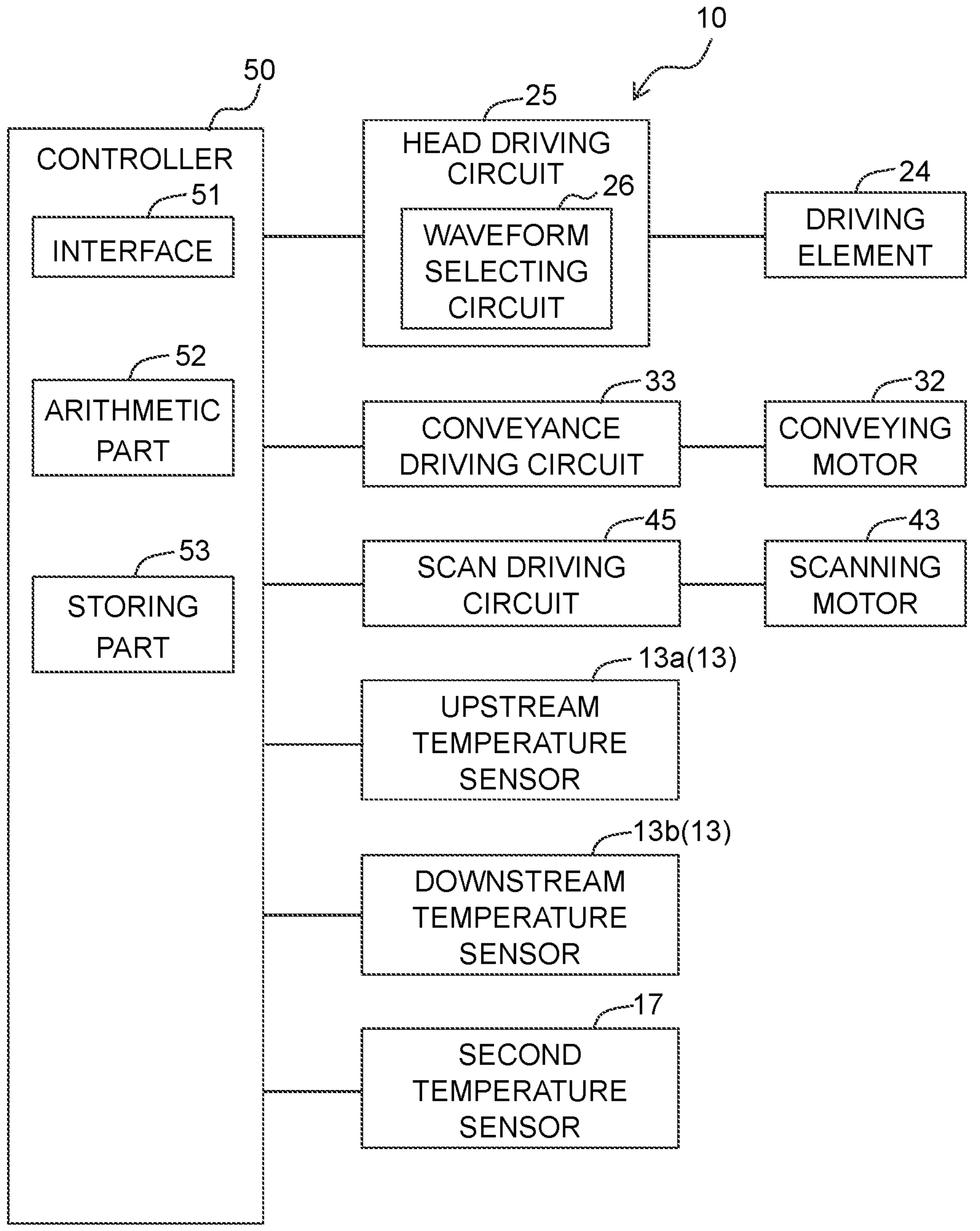
FIG. 2 is a block diagram depicting the functional configuration of the printing apparatus.

The conveyor 30 has, for example, two conveying rollers 31 and a conveying motor 32 (see FIG. 2). The two conveying rollers 31 interpose the platen 11 therebetween in the front-rear direction, and are arranged to be parallel to each other. Central axes of the two conveying rollers 31 extend in the left-right direction, and are connected to the conveying motor 32; the two conveying rollers 31 are rotated by driving of the conveying motor 32, and convey the print medium A on the platen 11 in the front-rear direction.

The scanning device 40 has a carriage 41, two guide rails 42, a scanning motor 43 (see FIG. 2) and an endless belt 44. The carriage 41 has the head 20 mounted thereon, and is supported by the two guide rails 42 to be movable in the left-right direction. The two guide rails 42 extend in the left-right direction at a location above the platen 11 so that the two guide rails 42 sandwich the lower surface of the head 20 therebetween in the front-rear direction. The endless belt 44 extends in the left-right direction and is attached to the carriage 41 and the scanning motor 43. In a case that the scanning motor 43 is driven, the endless belt 44 runs, thereby causing the carriage 41 to move reciprocally in the left-right direction along the guide rails 42. In a case that the carriage 41 is caused to move in the left-right direction along the guide rails 42, the carriage 41 moves the head 20 in a forwarding route and a returning route of the left-right direction.

The ink cartridge 12 is, for example, a tank which is attachable and detachable with respect to the casing 14, and store an ink. The ink cartridge 12 is connected to the head 20 by a tube 12*a*, and supplies the ink to the plurality of nozzles 21 of the head 20 via the tube 12*a*.

<Head>

Figure 3:
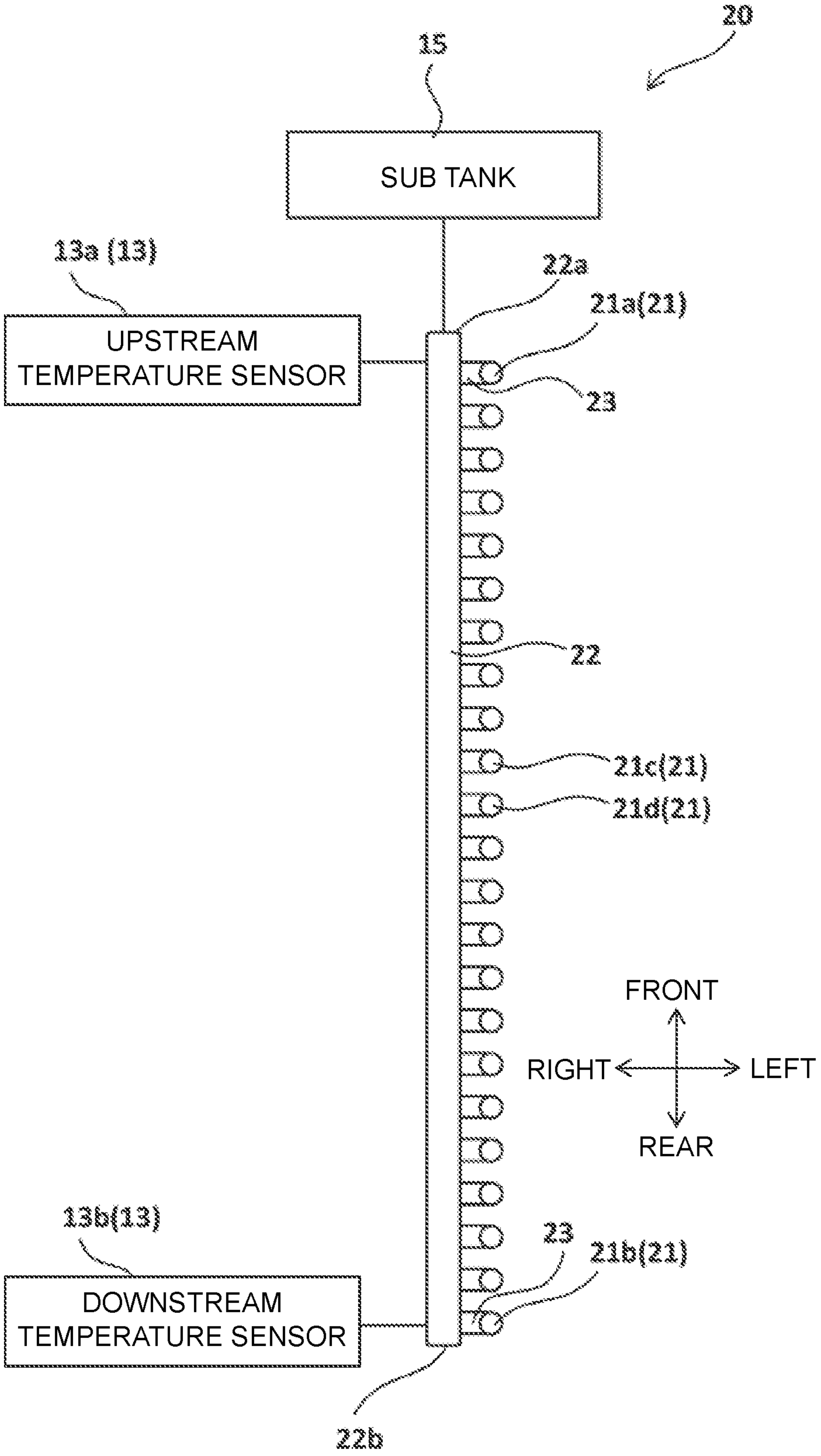
FIG. 3 is a view schematically depicting a manifold, nozzles and a first temperature sensor as seen therebelow.

As depicted in FIG. 1, the plurality of nozzles 21 are arranged side by side with equal spacing distances therebetween in the front-rear direction to thereby form a nozzle row. A plurality of pieces of the nozzle row are arranged side by side with equal spacing distances therebetween in the left-right direction. The plurality of nozzles 21 are opened in the lower surface of the head 20. As depicted in FIG. 3, nozzles 21 which are included in the plurality of nozzles 21 and which belong to one of the plurality of nozzle rows includes an upstream nozzle 21*a* which is a first nozzle arranged at a front location in the front-rear direction, and a downstream nozzle 21*a* which is a second nozzle arranged at a rear location in the front-rear direction.

In addition to the plurality of nozzles 21 arranged side by side in the front-rear direction, the head 20 has a manifold 22 communicating with the plurality of nozzles 21, and a driving element 24 (see FIG. 2) configured to apply a discharging pressure to the ink. Further, the head 20 has a sub tank 15 and a first temperature sensor 13 mounted thereon. The manifold 22 extends in the front-rear direction, and has a front end 22*a* which is one end thereof and a rear end 22*b* which is the other end thereof. A plurality of individual channels 23 are branched from the manifold 22 and are each connected to one of the plurality of nozzles 21. In each of the plurality of nozzle rows, the upstream nozzle 21*a* is close to the front end 22*a* of the manifold 22 in the front-rear direction than other nozzles 21 which are different from the upstream nozzle 21*a* in the nozzle row, and the downstream nozzle 21*b* is close to the rear end 22*b* of the manifold 22 in the front-rear direction than the other nozzles 21 which are different from the downstream nozzle 21*b* in the nozzle row.

The sub tank 15 is connected to the ink cartridge 12 (FIG. 1) by the tube 12*a*, and is also connected to the front end 22*a* of the manifold 22. Accordingly, the ink is supplied from the ink cartridge 12 to the sub tank 15 via the tube 12*a*, flows from the sub tank 15 into the manifold 22, and flows from the front end 22*a* toward the rear end 22*b* in the manifold 22. While the ink flows in the manifold 22, the ink flows into the plurality of individual channels 23, flows in the each of the plurality of individual channels 23, and is supplied to one of the plurality of nozzles 21.

The driving element 24 is a piezoelectric element, a heating element, an actuator of the electrostatic system, etc., is provided on each of the plurality of nozzles 21, and is driven so as to change the volume of one of the plurality of individual channels 23 connected to each of the plurality of nozzles 21. With this, a pressure for discharging or ejecting the ink from the nozzle 21 is applied to the ink in each of the plurality of individual channels 23.

The first temperature sensor 13 is a sensor such as a thermistor, etc., and detects temperature difference between the temperature of the ink at the upstream which is at the front (is a front part) in the front-rear direction and the temperature of the ink at the downstream which is at the rear (is a rear part) in the front-rear direction. For example, the first temperature sensor 13 has an upstream temperature sensor 13*a* and a downstream temperature sensor 13*b*. The upstream temperature sensor 13*a* is arranged in the vicinity of the front end 22*a* of the manifold 22 so as to detect the temperature of the ink at a front location in the manifold 22. The downstream temperature sensor 13*b* is arranged in the vicinity of the rear end 22*b* of the manifold 22 so as to detect the temperature of the ink at a rear location in the manifold 22.

<Configuration of Controller>

As depicted in FIG. 2, the controller 50 is, for example, a computer, and is provided with an interface 51, an arithmetic part 52 and a storing part 53. The interface 51 receives a variety of kinds of data from an external device such as a computer, a camera, a network, a recording medium, etc. The image data is, for example, raster data indicating an image to be printed on the print medium A, etc. Note that the controller 50 may be constructed of a single device, or may be configured so that a plurality of devices are arranged in a dispersed manner, and that the plurality of devices cooperate to perform an operation of the printing apparatus 10.

The storing part 53 is a memory which is accessible from the arithmetic part 52 and which has a RAM and a ROM. The RAM temporarily stores a variety of kinds of data such as the image data and data converted by the arithmetic part 52, etc. The ROM stores a program and a table, etc., for performing a variety of kinds of data processing. The arithmetic part 52 includes, for example, a processor such as a CPU or a circuit which is, for example, an integrated circuit such as ASIC, and executes a program stored in the ROM so as to control the respective parts or components, thereby executing a printing operation and a position correcting operation. Note that the details of the printing operation and the position correcting operation will be described later on.

Such a controller 50 is electrically connected to the conveying motor 32 of the conveyor 30, via a conveyance driving circuit 33, and controls the driving of the conveying motor 32. With this, the conveyance of the print medium A by the conveyor 30 is controlled. Further, the controller 50 is electrically connected to the scanning motor 43 of the scanning device 40, via a scan driving circuit 45, and controls the driving of the scanning motor 43. With this, the movement of the head 20 by the scanning device 40 is controlled.

Further, the controller 50 is electrically connected to the driving element 24, via a head driving circuit 25. The controller 50 outputs a control signal for the driving element 24 to the head driving circuit 25; the head driving circuit 25 generates a driving signal based on the control signal, and outputs the generated driving signal to the driving element 24. The driving element 24 is driven in accordance with the driving signal, so as to discharge the ink from the nozzle 21.

Namely, the controller 50 divides an image of image data into a plurality of areas, and performs a half tone processing with respect to the image data, for each of the divided areas, based on a predetermined look-up table stored in the storing part 53. With this, the image data is converted to have a gradation which can be outputted by the printing apparatus 10. The gradation of the image data after the conversion corresponds, for example, to a discharge amount of the ink with respect to one droplet of the ink (to be) discharged from the nozzle 21. Accordingly, the controller 50 selects one kind of a waveform signal, among a plurality of kinds of waveform signals, in accordance with a discharge amount of the ink based on the image data, so as to generate waveform selection data.

The waveform signal is, for example, a pulse signal, and has a non-discharge waveform signal by which the ink is not discharged from the nozzle 21 and a discharge signal by which the ink is discharged from the nozzle 21. In accordance with the discharge amount, the discharge signal has, for example, a small-sized droplet waveform signal for discharging the ink in an amount smaller than a predetermined amount (small-sized droplet), a medium-sized droplet waveform signal for discharging the ink in the predetermined amount (medium-sized droplet), and a large-sized droplet waveform signal for discharging the ink in an amount greater than the predetermined amount (large-sized droplet).

Further, the controller 50 divides the waveform selection data with respect to each of passes, and arranges the plurality of pieces of divided waveform selection data by an order of discharging the ink from the nozzles 21 in the pass. The controller 50 assigns each of the plurality of pieces of divided waveform selection data to a certain driving element 24, among a plurality of pieces of the driving element 24, which corresponds to (is in accordance with) a nozzle 21, among the plurality of nozzles 21, which discharges the ink, and to a driving timing for driving the certain driving element 24 in accordance with a landing position of the ink; and the controller 50 outputs control data including the waveform selection data and four kinds of waveform signals to the head driving circuit 25. In such a manner, by the control data, the discharge amount of the ink in accordance with the waveform selection data, the nozzle 21 from which the ink is to be discharged, and a discharge timing of the ink in accordance with the driving timing of the driving element 24 are defined.

The head driving circuit 25 selects one kind (one waveform signal) among the four kinds of waveform signals, based on the waveform selection data of the control data, and applies, as the driving signal, a signal of which voltage is in accordance with the waveform of the selected waveform signal. With this, the driving element 24 is driven in accordance with the driving signal, which in turn changes the volume of the individual channel 23 and applies the discharging pressure to the ink, thereby discharging the ink from the nozzle 21.

<Printing Operation>

In such a printing apparatus 10, the controller 50 obtains the image data and executes the printing operation based on the image data. In the printing operation, for example, the controller 50 executes a pass of forwarding route (forwarding route-pass) as a “first pass”. In the forwarding route-pass, the controller 50 discharges the ink from the head 20 onto the print medium A while moving the head in a forwarding route which is one direction in the left-right direction. After the forwarding route-pass, the controller 50 moves the print medium A frontward. Then, after the conveyance of the recording medium A, the controller 50 executes a pass of returning route (returning route-pass) as a “second pass”. In the returning route-pass, the controller 50 causes the head 20 to discharge the ink from the head 20 onto the print medium A while moving the head in a returning route which is the other direction in the left-right direction. After the returning route-pass, the controller 50 moves the print medium A frontward. Note that in the following description, although an explanation will be given with the direction of the forwarding route as the rightward (right side), and with the direction of the returning route as the leftward (left side), the directions or orientations of the forwarding route and the returning route are not limited to these.

In such a manner, the printing apparatus 10 alternately repeats the pass and the conveyance of the print medium A while alternately changing the forwarding route-pass and the returning route-pass in the pass, thereby advancing the printing operation of a bi-directional printing. In this pass, the ink discharged from the head 20 lands in a landing position on the print medium A on the platen 11 facing the lower surface of the head 20. A dot of the ink is formed in the landing position, and an image constructed of a plurality of pieces of the dot is printed on the print medium A.

In this printing operation, the driving elements 24 are driven every time the ink is discharged, and the driving elements 24 generate heat. This generation of heats warms or heats the ink in the manifold 22. On the other hand, the ink is supplied from the sub tank 15 to the manifold 22. Due to this, the temperature of the ink at a rear part of the manifold 22 becomes higher than the temperature of the ink at a front part, of the manifold 22, into which the ink flows from the sub tank 15, thereby generating any difference in the temperature of the ink in the manifold 22. As the temperature of the ink is higher, the viscosity of the ink becomes smaller; as a certain nozzle 21 is located further at a rear location among the nozzles 21 communicating with the manifold 22, the certain nozzle 21 is more distant from the upstream nozzle 21*a*, and the velocity of the ink discharged from the certain nozzle 21 becomes faster. Accordingly, the landing position of the ink in the print medium A is deviated from a desired position which is the landing position of the ink based on the image data of a case that there is not any difference in the temperature of the ink in the manifold 22. In view of this situation, the controller 50 performs the position correcting operation so as to correct the landing position of the ink, thereby lowering the deviation of the landing position.

<Position Correcting Operation>

The controller 50 executes the position correcting operation of correcting the discharge timing of the ink from the nozzles 21 based on the temperature difference so that a distance between a landing position of the ink discharged from the upstream nozzle 21*a* and a landing position of the ink discharged from the downstream nozzle 21*b* becomes short in the left-right direction.

For example, the controller 50 perform the correction, in the position correcting operation, so that discharge timing of the ink in the returning route-pass is delayed with respect to the discharge timing of the ink based on the image data, without correcting the discharge timing of the ink in the forwarding route-pass.

Figure 4A:
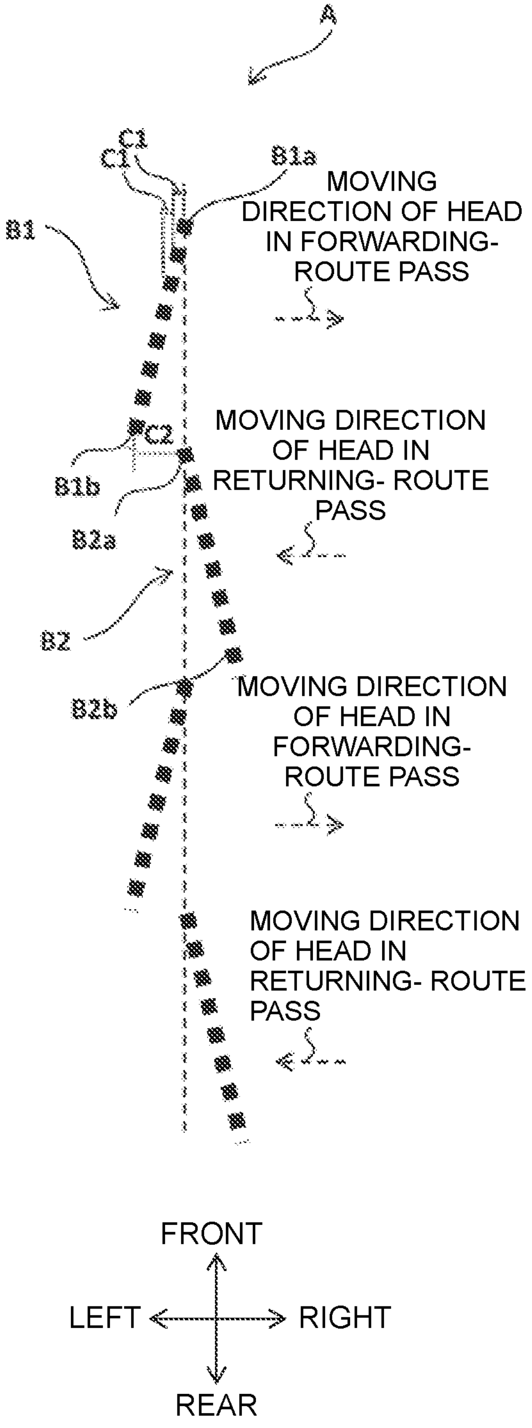
FIG. 4A is a view depicting a landing position of an ink based on image data.

Specifically, for example, the controller 50 discharges the ink from the nozzles 21 aligned in the front-rear direction, as depicted in FIG. 3, at the discharge timing based on the image data, so as to form a linear image extending in the front-rear direction. Here, in a case that there is not any difference in the temperature of the ink in the manifold 22, the linear image extends in the front-rear direction as indicated by a broken line in FIG. 4A. However, since the temperature of the ink is higher at a location further on the rear side, the velocity of the ink becomes higher in a nozzle 21 which is located at further on the rear side among the nozzles 21 aligned along the manifold 22. Due to this, the landing position of the ink discharged from the nozzle 21 located further on the rear side is deviated further toward the upstream side in a moving direction of the head 20. Namely, in the forwarding route-pass in which the head 20 moves rightward, a forwarding route landing position B1 is arranged obliquely further leftward with respect to the front-rear direction at a location further on the rear side, whereas in the returning route-pass in which the head 20 moves leftward, a returning route landing position B2 is arranged obliquely further rightward with respect to the front-rear direction at a location further on the rear side. Accordingly, the landing position of the ink from the nozzle 21 located further on the rear side, a deviating distance in the left-right direction from the landing position of the ink from the upstream nozzle 21*a* becomes greater. Further, the deviating distance between the landing position of the ink from the upstream nozzle 21*a* and the landing position of the ink from the downstream nozzle 21*b* becomes greater as the temperature difference is greater.

In the forwarding route-pass, the ink is discharged from the nozzles 21 while the head 20 is moving rightward. The forwarding route landing position B1 deviates greatly leftward, from an upstream forwarding route landing position B1*a* of the ink from the upstream nozzle 21*a*, toward a downstream forwarding route landing position B1*b* of the ink from the downstream nozzle 21*b*. Further, in the returning route-pass immediately after the forwarding route-pass, the ink is discharged from the nozzles 21 while the head 20 is moving leftward. The returning route landing position B2 is arranged after the forwarding route landing position B1, and deviates greatly rightward, from a upstream returning route landing position B2*a* of the ink from the upstream nozzle 21*a*, toward a downstream returning route landing position B2*b* of the ink from the downstream nozzle 21*b*.

A plurality of pieces of the forwarding route landing position B1 deviate from one another at a distance C1, and a plurality of pieces of the returning route landing position B2 deviate from one another also at the distance C1. With respect to this, the downstream forwarding route landing position B1*b* of the forwarding route landing position B1 and the upstream returning route landing position B2*a* of the returning route landing position B2 which are adjacent to each other in the front-rear direction are deviated from each other in the left-right direction at a distance C2. This distance C2 of the deviation (deviation distance C2) is greater than the distance C1 of the deviation (deviation distance C1), and thus the deviation between the passes of the downstream forwarding route landing position B1*b* and the upstream returning route landing position B2*a* easily becomes to be conspicuous.

Figure 5:
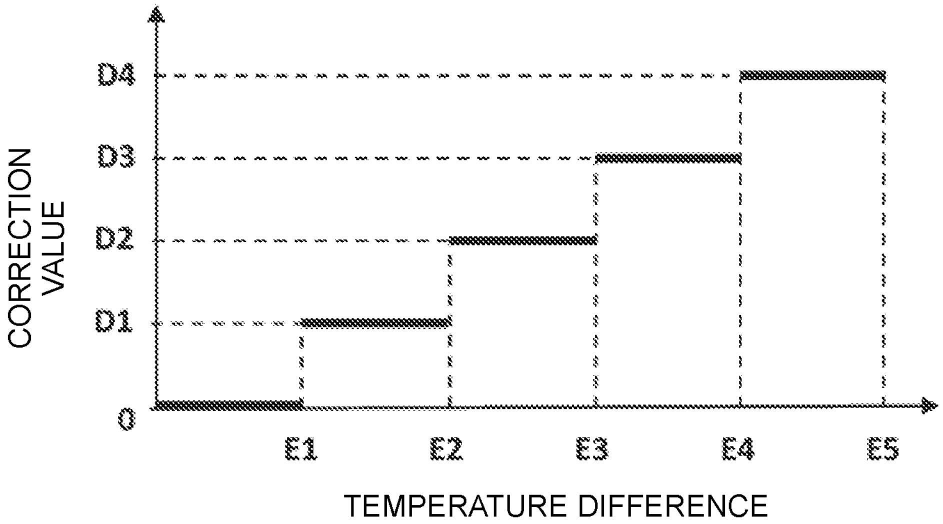
FIG. 5 is a graph indicating a corresponding relationship between a temperature difference of the ink and a correction value of the discharge timing.

In view of this, as depicted in the example of FIG. 5, the controller 50 corrects the discharge timing of the ink based on a predetermined corresponding relationship between a temperature difference of the ink between a front part and a rear part in the manifold 22 and a correction value of the discharge timing. Here, the controller 50 obtains the temperature of the ink at the front part of the manifold 22 by the upstream temperature sensor 13*a*, and obtains the temperature of the ink at the rear part of the manifold 22 by the downstream temperature sensor 13*b*. The controller 50 obtains a temperature difference by deducting the temperature of the front part from the temperature of the rear part, and obtains a correction value corresponding to this temperature difference from the graph of FIG. 5. For example, in a case that the temperature difference is not less than 0 and less than E1, the correction value is 0; in a case that the temperature difference is not less than E1 and less than E2, the correction value is a correction value D1; in a case that the temperature difference is not less than E2 and less than E3, the correction value is a correction value D2; in a case that the temperature difference is not less than E3 and less than E4, the correction value is a correction value D3; and in a case that the temperature difference is not less than E4 and less than E5, the correction value is a correction value D4. The temperature differences E1, E2, E3, E4 and E5 become greater in this order, and the correction values D1, D2, D3 and D4 becomes greater in this order. In such a manner, as the temperature difference is greater, the correction value becomes greater.

Figure 4B:
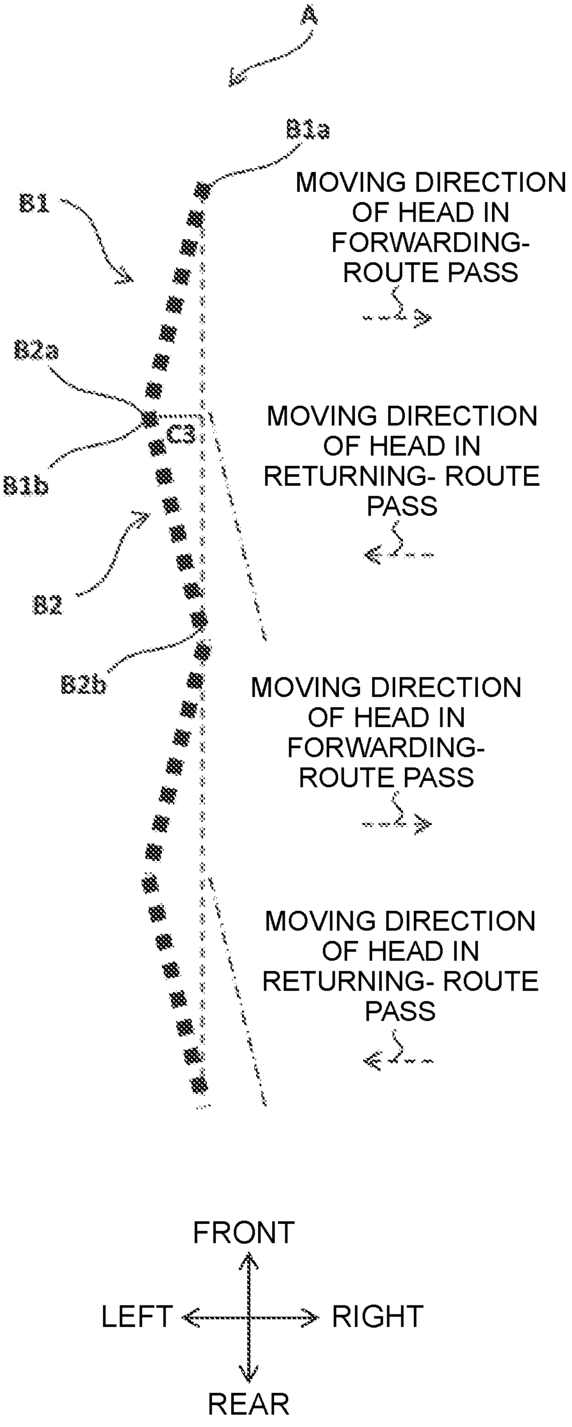
FIG. 4B is a view depicting a landing position of the ink of which discharge timing in a returning route is corrected by the printing apparatus.

The controller 50 obtains, from the control data of the returning route-pass, the driving timing of each of the driving elements 24 in accordance with the landing position of the ink, as the discharge timing based on the image data. For example, in a case that the temperature difference is not less than E2 and less than E3, the controller 50 corrects the control data of the returning route-pass so that all of discharge timings in the returning route-pass are slowed (delayed) by the correction amount D2 from the discharge timings based on the image data. With this, as depicted in FIG. 4B, all of the returning route landing positions B2, which are formed by one time of the returning route-pass (the returning route-pass performed once), are each shifted or displaced leftward by a distance (displacement distance) C3 from a desired position thereof indicated by a dash-dot line. By the displacement distance C3, a distance between passes which is a distance between the downstream forwarding route landing position B1*b* and the upstream returning route landing position B2*a* is reduced as compared with the deviation distance C2. Since the deviation of the landing positions between the passes are lowered in this manner, it is possible to reduce any lowering in the image quality due to the temperature difference in the head 20.

<Printing Method>

Figure 6A:
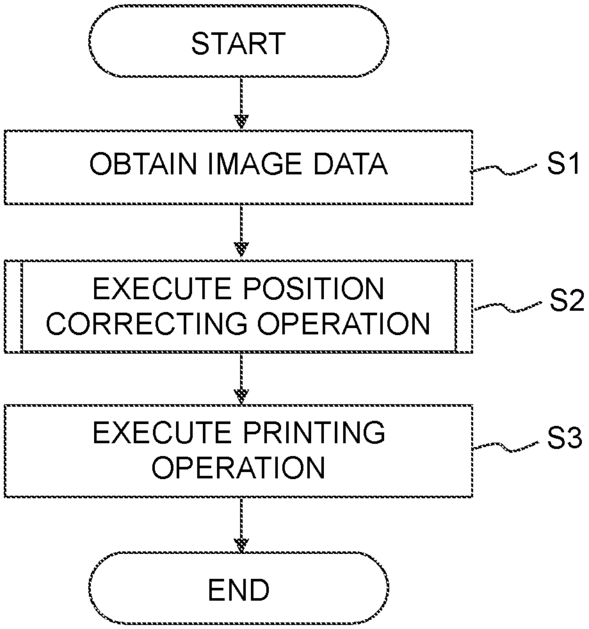
FIG. 6A is a flow chart indicating an example of a printing method.

The printing method is executed by the controller 50 along a flow chart, as depicted in FIG. 6A, which is an example of the printing method. First, the controller 50 obtains image data from an external apparatus (step S1). The controller 50 executes the position correcting operation. Here, the controller 50 obtains, from the image data, a discharge amount of the ink for each of areas (regions) of the image data, and allocates waveform selection data in accordance with the discharge amount to each of the driving elements 24 and to the driving timing, thereby generating control data of each of the driving elements 24 for each of the passes. Then, the controller 50 executes the position correcting operation of performing correction so as to delay the discharge timing from the discharge timing based on the image data (step S2).

Figure 6B:
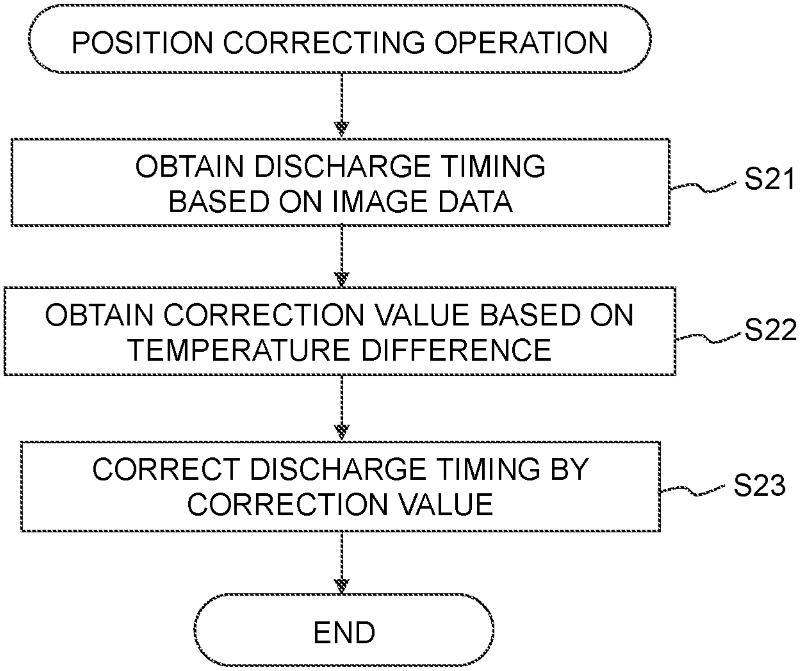
FIG. 6B is a flow chart indicating an example of a position correcting operation.

In accordance with a flow chart, as depicted in an example of FIG. 6B, the controller 50 obtains the driving timing of the control data of the forwarding route-pass, as the discharge timing based on the image data (step S21). Further, the controller 50 obtains the temperature difference of the ink in the manifold 22 based on a temperature detected by the first temperature sensor 13, and obtains a correction value corresponding to the temperature difference from the predetermined corresponding relationship in FIG. 5 (step S22). Then, the controller 50 performs correction of the discharge timing so as to delay, by the correction value, the discharge timing based on the image data, and obtains this corrected control data (step S23).

In step S3 of FIG. 6A, the controller 50 executes the printing operation while driving each of the driving elements 24 by the corrected control data (step S3). With this, since the returning route landing position B2 of the returning route-pass is displaced by the distance C3, the distance between passes in the left-right direction between the downstream forwarding route landing position B1*b* and the upstream returning route landing position B2*a* becomes shorter than the deviation distance C2. Accordingly, it is possible to reduce any lowering in the image quality due to the temperature difference in the head 20.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

First Modification

A printing apparatus 10 according to a first modification is provided with the carriage 41 configured to move the head 20 in the forwarding route and the returning route in the left-right direction. In the printing operation, the controller 50 alternately executes the forwarding route-pass of discharging the ink from the nozzle 21 while moving the head 20 in the forwarding route and the returning route-pass of discharging the ink from the nozzles 21 while moving the head 20 in the returning route. In the position correcting operation, the controller 50 performs correction, with respect to the forwarding route-pass and the returning route-pass, so that the discharge timing of the ink is delayed with respect to the discharge timing of the ink based on the image data in either one of: only the forwarding route-pass of the forwarding route-pass and the returning route-pass; and both of the forwarding route-pass and the returning route-pass.

Specifically, in the position correcting operation of FIG. 6B, the controller 50 obtains the driving timing of each of the driving elements 24 as the discharge timing based on the image data, from the control data of the forwarding route-pass (step S21). Further, the controller 50 obtains the temperature difference of the ink in the manifold 22 based on the temperature detected by the first temperature sensor 13, and obtains, for example, the correction value D2 of the discharge timing corresponding to the temperature difference of not less than E2 and less than E3 from the predetermined corresponding relationship in FIG. 5, etc. (step S22). Then, the controller 50 performs correction of the control data of the forwarding route-pass based on the image data, by the correction value, so as to delay all the discharge timings in the forwarding route pass based on the image data by the correction value, without correcting the discharge timing in the returning route-pass based on the image data.

Figure 7A:
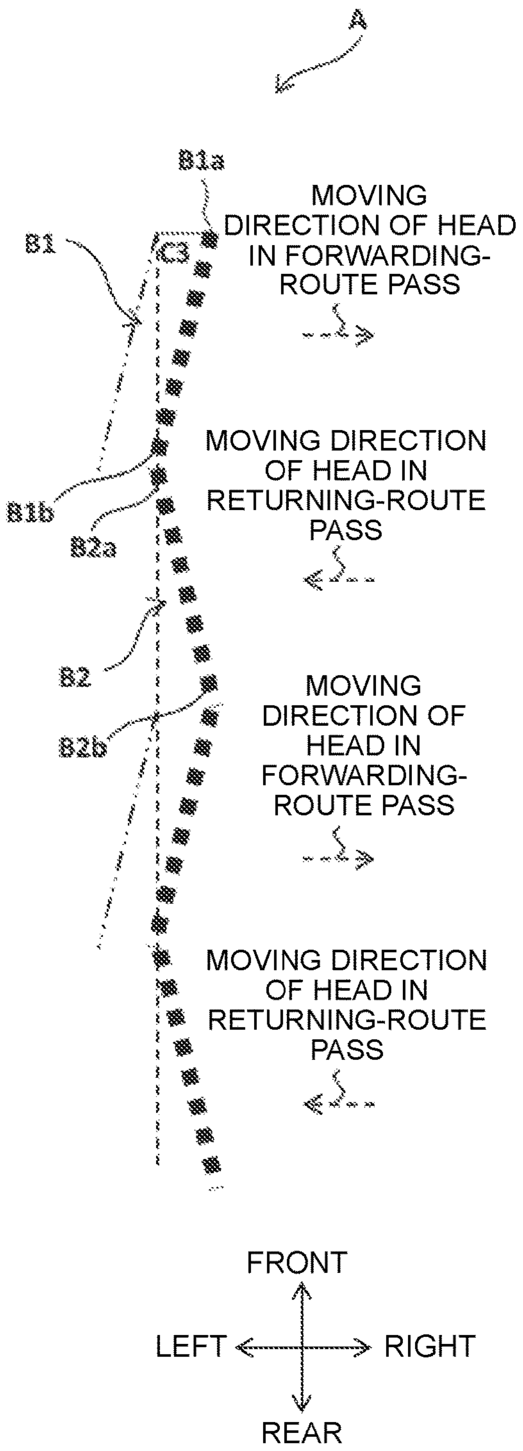
FIG. 7A is a view depicting a landing position of the ink of which discharge timing in a forwarding route is corrected in a printing apparatus.

The controller 50 executes the printing operation while driving each of the driving elements 24 by the corrected control data (step S3). With this, as depicted in FIG. 7A, in the forwarding route-pass in which the head 20 moves rightward, all the forwarding route landing positions B1 are each displaced rightward by the distance C3 from a desired position thereof indicated by a two-dot chain line. Due to this, since the distance between passes becomes shorter than the deviation distance, it is possible to reduce any lowering in the image quality due to the temperature difference in the head 20.

Alternatively, in the position correcting operation of FIG. 6B, the controller 50 obtains the driving timing of each of the driving elements 24, from the control data of the forwarding route-pass and the control data of the returning route-pass, as the discharge timing based on the image data (step S21). Further, the controller 50 obtains, for example, the correction value D2 of the discharge timing corresponding to the temperature difference, of the manifold 22, of not less than E2 and less than E3 from the predetermined corresponding relationship in FIG. 5, etc. (step S22). Then, the controller 50 performs correction of the discharge timing of the forwarding route-pass so as to delay all the discharge timings in the forwarding route-pass based on the image data by a predetermined ratio of the correction value D2 (for example, D2×d %). Further, the controller 50 performs a correction of the discharge timing of the returning route-pass so as to delay all the discharge timings in the returning route-pass based on the image data by a remaining ratio of the correction value D2 (for example, D2×(100−d) %).

Figure 7B:
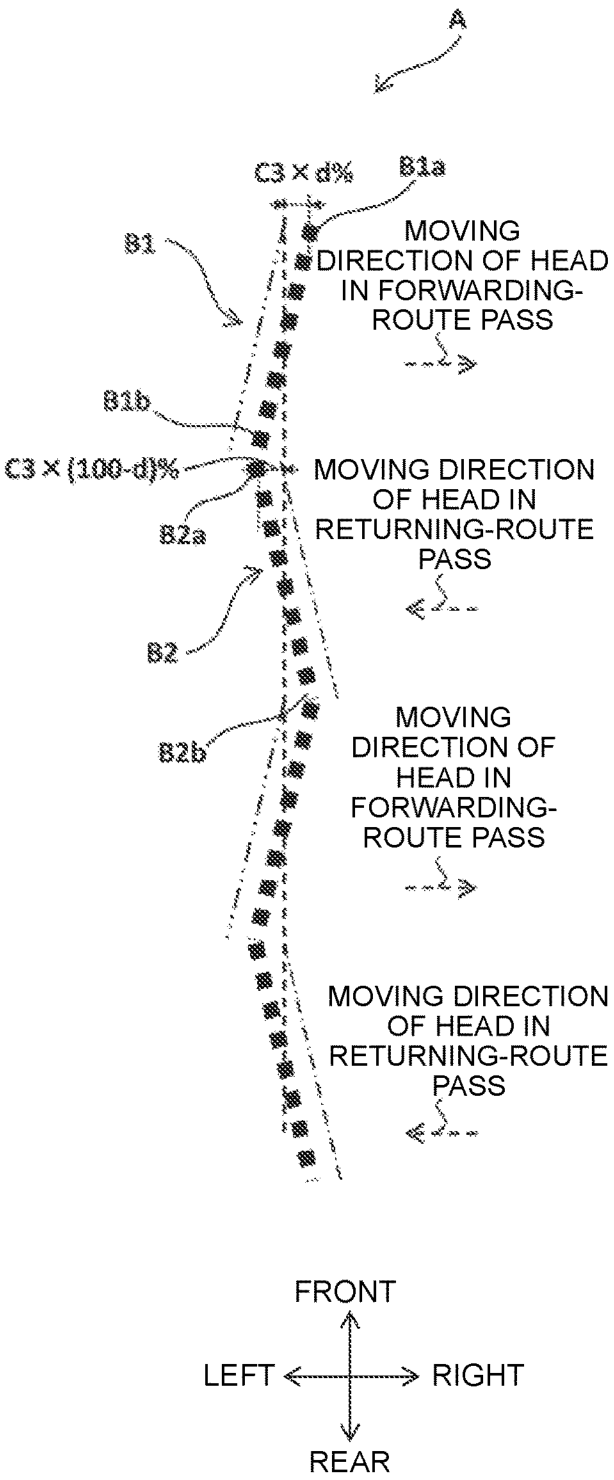
FIG. 7B is a view depicting a landing position of the ink of which discharge timing in each of the forwarding route and the returning route is corrected in the printing apparatus.

The controller 50 executes the printing operation while driving each of the driving elements 24 by the corrected control data (step S3). With this, as depicted in FIG. 7B, in the forwarding route-pass in which the head 20 moves rightward, all the forwarding route landing positions B1 in the forwarding route-pass are each displaced rightward by the predetermined ratio of the distance C3 (for example, C3×d %) from a desired position thereof indicated by a two-dot chain line. Furthermore, in the returning route-pass in which the head 20 moves leftward, all the returning route landing positions B2 in the returning route-pass are each displaced leftward by the remaining ratio of the distance C3 (for example, C3×(100−d) %) from a desired position thereof indicated by a one-dot chain line. Since the distance between passes becomes shorter, by the sum of the displacement distance C3×d % and the displacement distance C3×(100−d) %, than the deviation distance, it is possible to reduce any lowering in the image quality due to the temperature difference in the head 20.

Second Modification

In a printing apparatus 10 according to a second modification, the returning route pass is executed immediately after the forwarding route-pass. The landing position of the ink includes a first landing position of the ink from the upstream nozzle 21*a* in the returning route-pass, and a second landing position of the ink from the upstream nozzle 21*a* and a third landing position of the ink from the downstream nozzle 21*b* in the forwarding route-pass. In the position correcting operation, in a case that the temperature difference is a first temperature difference, the controller 50 performs correction of delaying the discharge timing of the ink in the returning route-pass with respect to the discharge timing of the ink based on the image data so that the first landing position is arranged, in the second direction, to be more distant from the second landing position than the third landing position. In the position correcting operation, in a case that the temperature difference is a second temperature difference which is greater than the first temperature difference, the controller 50 performs correction of delaying the discharge timing of the ink in the returning route-pass with respect to the discharge timing of the ink based on the image data so that the first landing position is arranged, in the second direction, to be nearer to the second landing position than the third landing position.

Figure 8A:
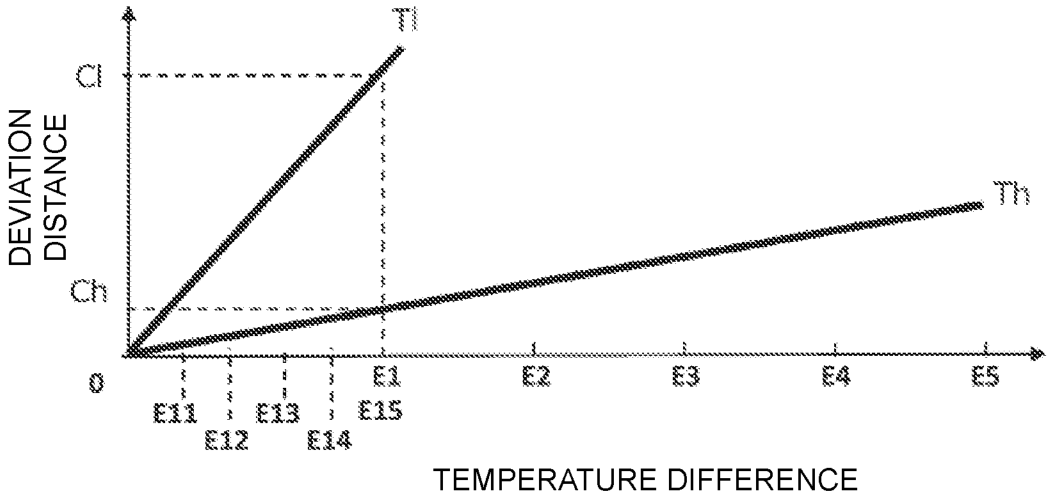
FIG. 8A is a graph indicating a relationship between the temperature difference of the ink and a deviation distance of the landing position in a printing apparatus.

Specifically, a graph of FIG. 8A indicates a corresponding relationship between the temperature difference of the ink in the manifold 22 and a deviation distance which is a distance between the downstream landing position and the upstream landing position in the left-right direction. As indicated by this graph, as the temperature difference is greater, the deviation distance becomes greater. The rate of change of the deviation distance with respect to the temperature difference is greater in a case that the temperature of the ink supplied to the manifold 22 is a temperature T1 which is less than a predetermined temperature than in a case that the temperature of the supplied ink is a temperature Th which is not less than the predetermined temperature. Accordingly, in a case that the temperature difference is E1, a deviation distance C1 in the supplied temperature T1 is greater than a deviation distance Ch in the supplied temperature Th.

Figure 8B:
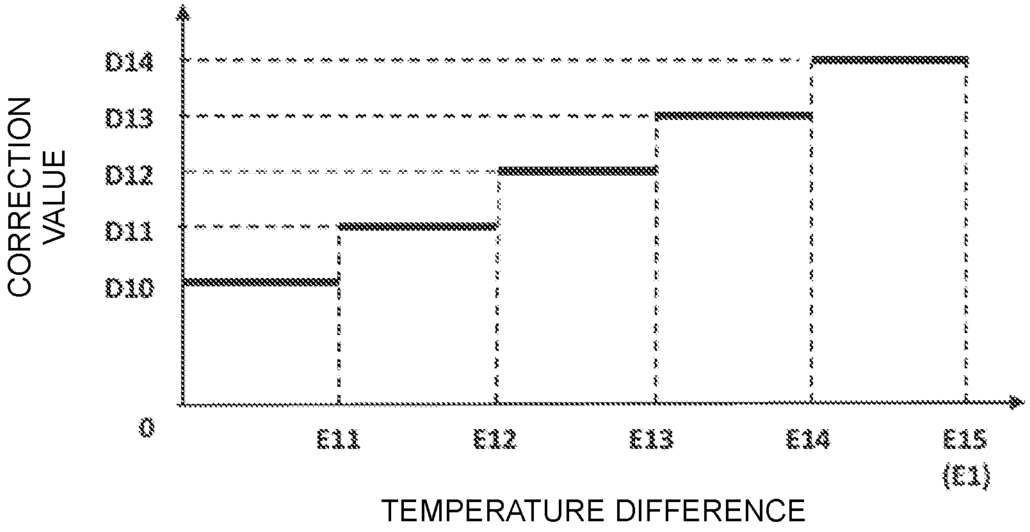
FIG. 8B is a graph indicating the corresponding relationship between the temperature difference of the ink and the correction value of the discharge timing in the printing apparatus.

In such a manner, in a case that the temperature of the supplied ink is the supplied temperature T1 which is low, the change of the deviation distance with respect to the temperature difference is great, and thus there is such a case that the deviation distance cannot be sufficiently corrected by the correction value of FIG. 5. In view of this, for example as depicted in FIG. 8A, in a temperature range in which the temperature difference is not less than 0 and less than E1 which is small, it is allowable to use a predetermined corresponding relationship as indicated in FIG. 8B, in which the correction value with respect to the temperature difference is great. The correction value in FIG. 8B is greater than the correction value of FIG. 5, and the width of the temperature difference in FIG. 8B is narrower than the width of the temperature difference in FIG. 5.

Figure 9:
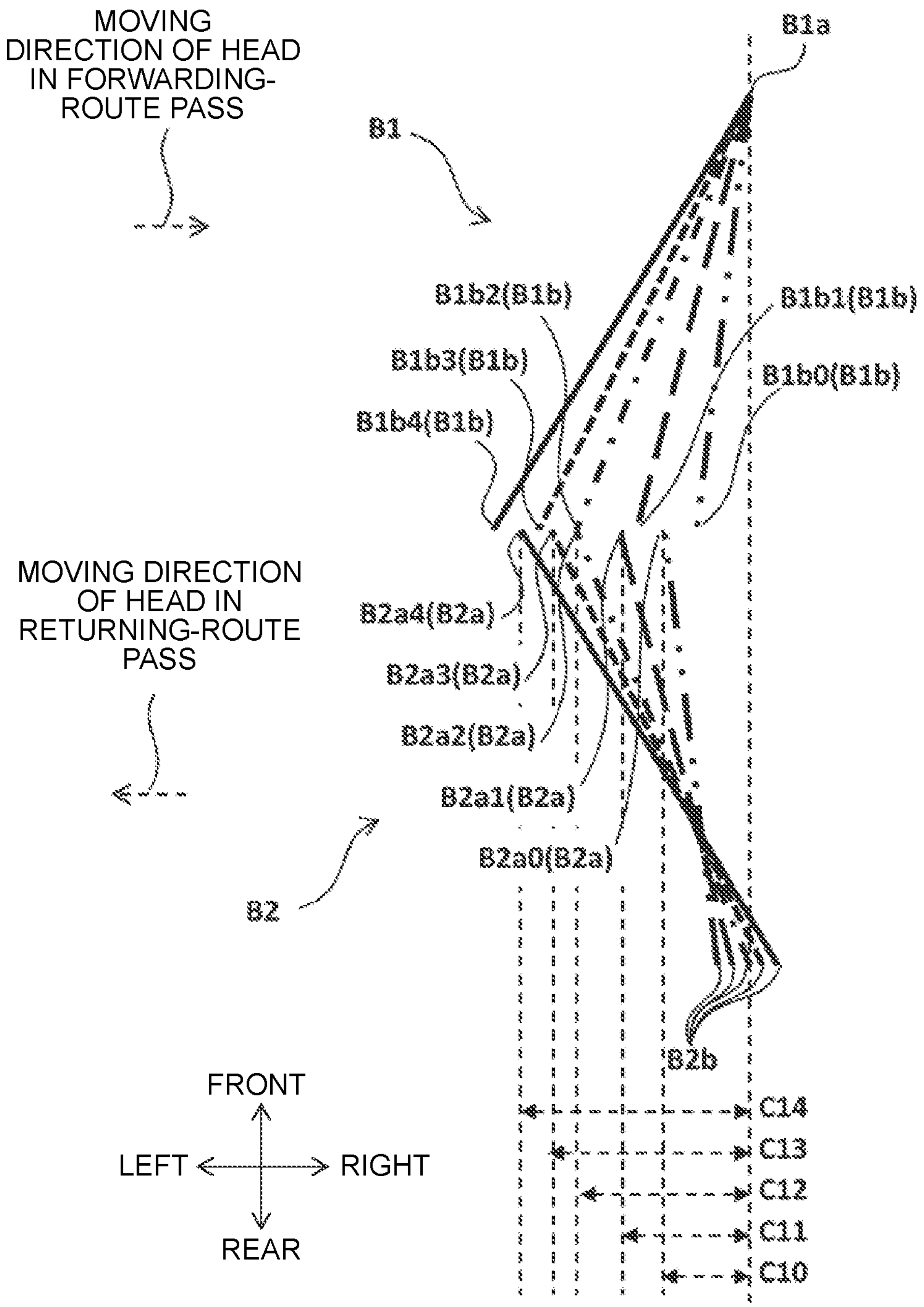
FIG. 9 is a view depicting the landing position of the ink of which discharge timing in the returning route is corrected by the correction value of FIG. 8B.

In the printing method, in step S22 of FIG. 6, the controller 50 obtains a correction value in accordance with the temperature difference from the predetermined corresponding relationship of FIG. 8B. Further, the controller 50 performs correction of the discharge timing so as to delay the discharge timing based on the image data by the correction value. With this, in a case that, for example, the temperature difference is not less than a predetermined temperature difference E12 and less than a predetermined temperature difference E13, and that the discharge timing is delayed, by a correction value D12, from the discharge timing based on the image data, the returning route landing position B2 is displaced leftward from a desired position by a displacement distance C12 which is in accordance with the correction value D12, as depicted in FIG. 8B and FIG. 9. With this, an upstream returning route landing position B2*a*2 of the returning route landing position B2 becomes to be coincident with or near to a downstream forwarding route landing position B1*b*2 of the forwarding route landing position B1 in the left-right direction, and the distance between passes is reduced as compared with the deviation distance C2.

Further, in a case that the temperature difference is a temperature difference which is smaller than the predetermined temperature difference, for example, the temperature difference is not less than 0 and less than E11 and that the controller 50 performs correction of delaying the discharge timing from the discharge timing based on the image data by a corrected amount D10, an upstream returning route landing position B2*a*0 of the returning route landing position B2 is corrected to be displaced leftward with respect to a downstream forwarding route landing position B1*b*0 of the forwarding landing position B1, by a displacement distance C10 which is in accordance with the correction value D10. Furthermore, in a case that the temperature difference is a temperature difference which is smaller than the predetermined temperature difference, for example, the temperature difference is not less than E11 and less than E12 and that the controller 50 performs correction of delaying the discharge timing from the discharge timing based on the image data by a corrected amount D11, an upstream returning route landing position B2*a*1 of the returning route landing position B2 is corrected to be displaced leftward with respect to a downstream forwarding route landing position B1*b*1 of the forwarding landing position B1, by a displacement distance C11 which is in accordance with the correction value D11, in a similar manner as in the case that the temperature difference is not less than 0 and less than E11.

On the other hand, in a case that the temperature difference is a temperature difference which is greater than the predetermined temperature difference, for example, the temperature difference is not less than E13 and less than E14 and that the controller 50 performs correction of delaying the discharge timing from the discharge timing based on the image data by a corrected amount D13, an upstream returning route landing position B2*a*3 of the returning route landing position B2 is corrected to be displaced rightward with respect to a downstream forwarding route landing position B1*b*3 of the forwarding landing position B1, by a displacement distance C13 which is in accordance with the correction value D13. Further, in a case that the temperature difference is a temperature difference which is smaller than the predetermined temperature difference, for example, the temperature difference is not less than E14 and less than E15 and that the controller 50 performs correction of delaying the discharge timing from the discharge timing based on the image data by a corrected amount D14, an upstream returning route landing position B2*a*4 of the returning route landing position B2 is corrected to be displaced rightward with respect to a downstream forwarding route landing position B1*b*4 of the forwarding landing position B1, by a displacement distance C14 which is in accordance with the correction value D14, in a similar manner as in the case that the temperature difference is not less than E13 and less than E14.

In the returning route landing position B2 and the forwarding route landing position B1 which are corrected in such a manner, the distance between passes in the left-right direction between the upstream returning route landing position B2*a* and the downstream forwarding route landing position B1*b* is the smallest at the predetermined temperature difference, and becomes greater as the temperature difference becomes greater than the predetermined temperature difference. Further, in the temperature difference smaller than the predetermined temperature difference, the displacement distance based on the correction value is set to be greater than the deviation distance so that the upstream returning route landing position B2*a* is positioned on the left side with respect to the downstream forwarding route landing position B1*b* and that the upstream returning route landing position B2*a* is positioned to be more distant from the upstream forwarding route landing position B1*a* than the downstream forwarding route landing position B1*b* in the left-right direction. On the other hand, in the temperature difference greater than the predetermined temperature difference, the displacement distance based on the correction value is set to be smaller than the deviation distance so that the upstream returning route landing position B2*a* is positioned on the right side with respect to the downstream forwarding route landing position B1*b* and that the upstream returning route landing position B2*a* is positioned to be nearer to the upstream forwarding route landing position B1*a* than the downstream forwarding route landing position B1*b* in the left-right direction. With this, even in a case that the change of the deviation distance with respect to the temperature difference is great, the distance between passes becomes shorter than the deviation distance, thereby making it possible to reduce any lowering in the image quality due to the temperature difference of the liquid in the head 20.

Third Modification

A printing apparatus 10 according to a third modification is provided with a case 16 configured to accommodate the ink cartridge 12 and a second temperature sensor 17 configured to detect the environmental temperature in the inside of the case 16. The controller 50 corrects, in the position correcting operation, the discharge timing of the ink based on the environmental temperature and based on the temperature difference.

Specifically, as depicted in FIG. 1, the case 16 has an internal space; the ink cartridge 12 is accommodated in the internal space. The second temperature sensor 17 is a sensor such as a thermistor, and is arranged, for example, in the vicinity of the ink cartridge 12 in the inside of the case 16 so as to detect the temperature of the ink stored in the ink cartridge 12 inside the case 16. As depicted in FIG. 2, the second temperature sensor 17 is connected to the controller 50, and outputs a detected temperature to the controller 50.

As depicted in FIG. 8A, the deviation distance of the landing position is different due to the temperature difference of the ink in the manifold 22, and also due to the temperature of the ink flowing into the manifold 22. This ink flows from the ink cartridge 12 inside the case 16 into the manifold 22, via the sub stank 15. Accordingly, the environmental temperature inside the case 16 which is the detected temperature detected by the second temperature sensor 17 corresponds to the temperature of the ink flowing into the manifold 22. Therefore, the controller 50 obtains the detected temperature by the second temperature sensor 17 as the environmental temperature, and also obtains the temperature difference of the ink inside the manifold 22 from the first temperature sensor 13.

Then, the controller 50 obtains a correction value based on the environmental temperature and the temperature difference of the ink, for example, based on a predetermined relationship as depicted in FIG. 10. In FIG. 10, a corresponding relationship among the environmental temperature, the temperature difference of the ink and the correction value are determined previously in a table and stored in the storing part 53 so that as the temperature difference of the ink is greater, the correction value becomes greater and as the environmental temperature is smaller, the correction value becomes greater. The controller 50 performs correction so that the discharge timing of the ink is delayed, by the correction value, with respect to the discharge timing of the ink based on the image data. With this, in a case that the controller 50 performs the printing operation by the corrected discharge timing, a landing position of at least one of the forwarding route landing position B1 and the returning route landing position B2 is displaced from a desired position, by a displacement distance which is in accordance with the correction value. Owing to this displacement, the distance between passes becomes shorter than the deviation distance, thereby making it possible to reduce any lowering of the image quality due to the temperature difference of the liquid in the head 20.

Fourth Modification

In the above-described embodiment and modifications, the controller 50 corrects the discharge timings of all the nozzles 21 communicating with the manifold 22 by the correction value in accordance with the temperature difference of the ink between the upstream and downstream in the manifold 22. In view of this, in a printing apparatus 10 according to a fourth modification, the controller 50 corrects the discharge timing of the ink per one piece of the nozzle 21 or per nozzles 21 (a plurality of piece of the nozzle 21) among the plurality of nozzles 21 communicating with the manifold 22, by a correction value in accordance with the temperature difference.

Specifically, a corresponding relationship among the temperature difference of the ink, an order of each of the nozzles 21 and the correction value of the discharge timing as depicted in FIG. 11 is determined previously in a table and stored in the storing part 53. In FIG. 11, the temperature difference of the ink between the front part and the rear part in the manifold 22 is indicated in the lateral direction of the graph; as the temperature difference is greater, the correction value is greater. Further, in FIG. 11, the orders of the nozzles 21 which are aligned (arranged side by side) in order from the front side along the manifold 22 are indicated. An upstream nozzle 21*a* is a first nozzle 21, and a downstream nozzle 21*b* is a 79th nozzle 21. As the order of a certain nozzle 21 is great, a distance in the front-rear direction from the upstream nozzle 21*a* to the certain nozzle 21 becomes greater, and the temperature difference with respect to the upstream nozzle 21*a* becomes greater, and thus the correction value for the certain nozzle 21 is great. For example, the nozzles 21 have an intermediate nozzle 21 between the upstream nozzle 21*a* and the downstream nozzle 21*b*. The downstream nozzle 21*b* is farther away (separated) from the upstream nozzle 21*a* than the intermediate nozzle 21, the temperature of the ink of the downstream nozzle 21*b* is higher than that of the intermediate nozzle 21. Accordingly, the temperature difference between the upstream nozzle 21*a* and the downstream nozzle 21*b* is greater than the temperature difference between the upstream nozzle 21*a* and the intermediate nozzle 21, and the correction value with respect to the downstream nozzle 21*b* is greater than the correction value with respect to the intermediate nozzle 21.

In step S22, the controller 50 refers to the predetermined corresponding relationship of FIG. 11, and obtains, from the temperature difference of the ink based on the first temperature sensor 13, the correction value with respect to each of the nozzles 21. For example, in a case that the temperature difference is 5° C., the controller 50 obtains a correction value 0 with respect to the 1st to 9th nozzles 21, obtains a correction value “1” with respect to the 10th to 19th nozzles 21, obtains a correction value “2” with respect to the 20th to 39th nozzles 21, obtains a correction value “3” with respect to the 40th to 59th nozzles 21, and obtains a correction value “4” with respect to the 60th to 79th nozzles 21. Then, the controller 50 performs correction of delaying the discharge timing of the ink from the 10th to 19th nozzles 21, by the correction value 1, from the discharge timing based on the image data, without correcting the discharge timing of the ink from the 1st to 9th nozzles 21. The controller 50 performs correction of delaying the discharge timing of the ink from the 20th to 39th nozzles 21, the discharge timing of the ink from the 40th to 59th nozzles 21 and the discharge timing of the ink from the 60th to 79th nozzles 21, each by the respective correction value therefor, from the discharge timing based on the image data, in a similar manner with respect to the 10th to 19th nozzles 21.

In a case that the controller 50 performs the printing operation by the corrected discharge timings, at least one of the forwarding route landing position B1 and the returning route landing position B2 is displaced from the desired position, by a displacement distance corresponding to the correction value. With this, the landing position of the ink is corrected by the displacement distance which is in accordance with the temperature of the ink to be discharged from each of the nozzles 21. Accordingly, in the left-right direction, a distance between the upstream forwarding route landing position B1*a* and the downstream forwarding route landing position B1*b*, a distance between the downstream forwarding route landing position B1*b* and the upstream returning route landing position B2*a* and a distance between the upstream returning route landing position B2*a* and the downstream returning route landing position B2*b* become shorter than the deviation distance, thereby making is possible to reduce any lowering of the image quality due to the temperature difference of the liquid in the head 20.

Fifth Modification

Figure 12:
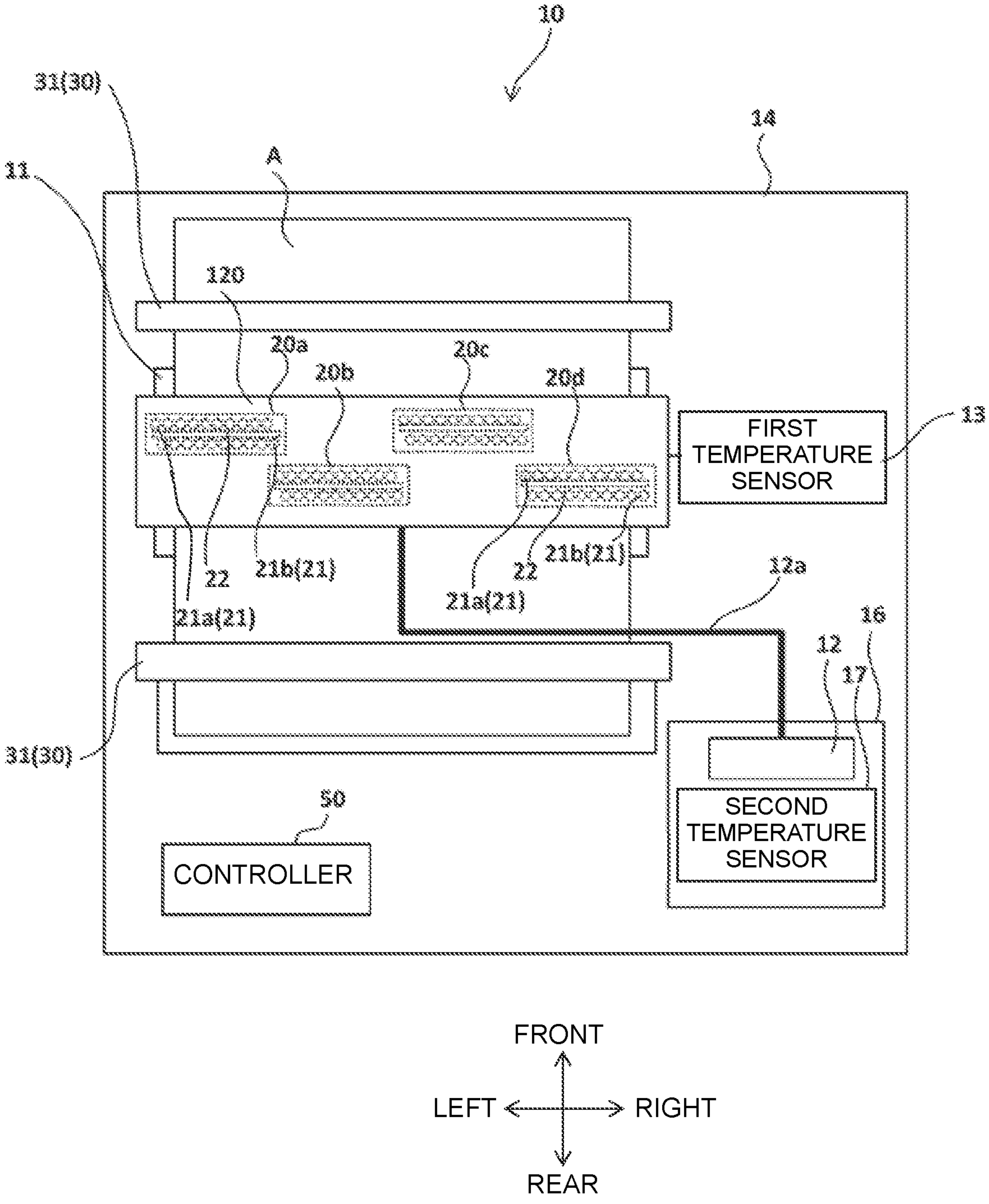
FIG. 12 is a view depicting the schematic configuration of a printing apparatus.

A printing apparatus 10 according to a fifth modification is of the line head system as depicted in FIG. 12; the printing apparatus 10 is provided with a head unit 120, a platen 11, a conveyor 30, an ink cartridge 12, a first temperature sensor 13, a casing 14 and a controller 50, without being provided with the scanning device 40 of FIG. 1. The head unit 120 has a plurality of (four example, four) heads 20 which include a first head 20*a*, a second head 20*b*, a third head 20*c* and a fourth head 20*d*; these heads 20 are arranged in this order from the left side to the right side. In the head unit 120, these heads 20 are arranged along the left-right direction and adjacent heads, among the heads 20, are arranged to be shifted from each other in the front-rear direction. Accordingly, the plurality of heads 20 are arranged in the left-right direction so that one piece of the heads 20 is alternately disposed, in the front-rear direction, with respect to another piece of the head 20. In each of the heads 20, the manifold 22 extends in the left-right direction, a plurality of nozzles 21 are aligned in the left-right direction along the manifold 22 so as to form nozzle rows. The plurality of heads 20 are arranged to form a row so that the plurality of nozzles 21 extend to be longer than the print medium A in the left-right direction, with equal spacing distances therebetween in the left-right direction.

Figure 13A:
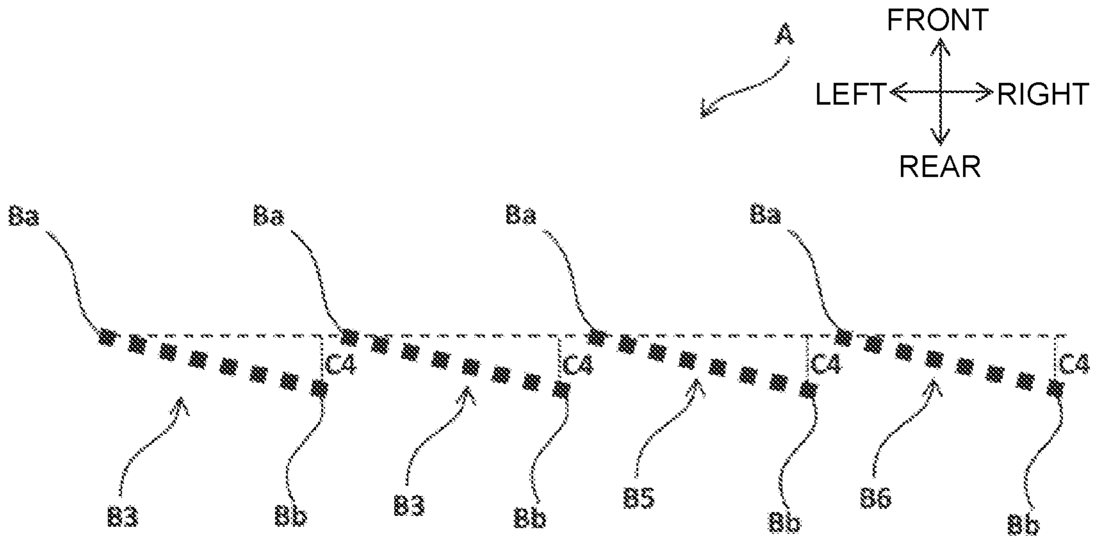
FIG. 13A is a view depicting a landing position of the ink based on image data by the printing apparatus of FIG. 12.
Figure 13B:
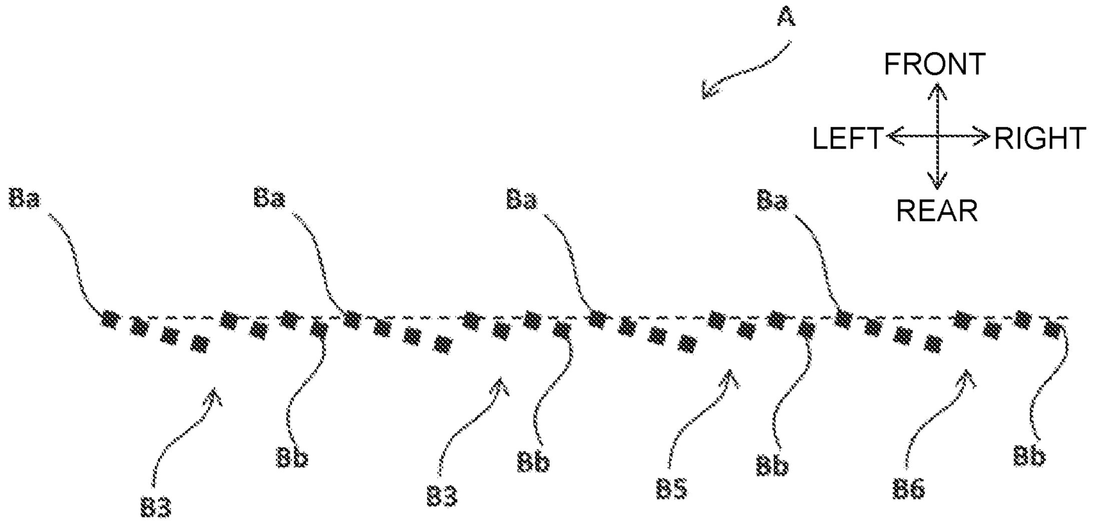
FIG. 13B is a view depicting a landing position of the ink of which discharge timing is corrected by the correction value of FIG. 11.

In the printing operation, the controller 50 discharges the ink from the nozzles 21 by the driving of the driving elements 24, while conveying the print medium A frontward by the conveyor 30. Accordingly, as depicted in FIG. 13, a landing position B3 of the ink from the first head 21*a*, a landing position B4 of the ink from the second head 21*b*, a landing position B5 of the ink from the third head 21*c* and a landing position B6 of the ink from the fourth head 21*d* are arranged side by side from the left to the right. Here, in a case that there is any temperature difference of the ink between a front part and a rear part in the manifold 22, even there is an attempt to print a linear image indicated by a broken line, the landing positions B3, B4, B5 and B6 based on the image are deviated rearward from desired positions thereof, respectively, as indicated in FIG. 13A. Here, an upstream landing position Ba from the upstream nozzle 21*a* is closest (nearest) to the desired landing position, and a downstream landing position Bb from the downstream nozzle 21*b* is farthest from the desired landing position, by a deviation distance C4. Accordingly, the controller 50 executes a position correcting operation of correcting the discharge timing of the ink from each of the nozzles 21, based on the temperature difference, so that the distance between the upstream landing position Ba and the downstream landing position Bb becomes short in the front-rear direction.

In step S22, for example, the controller 50 refers to the predetermined corresponding relationship of FIG. 11, and obtains, from the temperature difference of the ink based on the first temperature sensor 13, the correction value with respect to each of the nozzles 21. Then, the controller 50 corrects the discharge timing of the ink with respect to each of the nozzles 21, so as to delay the discharge timing from the discharge timing based on the image data, by the correction value. Further, in a case that the controller 50 performs the printing operation by the corrected discharge timings, the downstream landing position Bb is displaced frontward by a displacement distance which is in accordance with the corrected value. Accordingly, in the front-rear direction, the distance between the upstream landing position Ba and the downstream landing position Bb becomes shorter than the deviation distance C4 in each of the landing positions B3, B4, B5 and B6, thereby making is possible to reduce any lowering of the image quality due to the temperature difference of the liquid in the head 20.

Second Embodiment

In a printing apparatus 10 according to a second embodiment, an image is constructed of a plurality of dots. The controller 50 executes a density correcting operation of correcting, based on the temperature difference, a discharge amount of the ink based on image data with respect to the dots so that a difference of density (density difference) in the first direction of the image becomes smaller.

For example, the controller 50 corrects, in the density correcting operation, the discharging amount of the ink to be 0 with respect to a dot which is included in the plurality of dots and of which quantity corresponds to a ratio based on the temperature difference.

<Density Correcting Operation>

Figure 14:
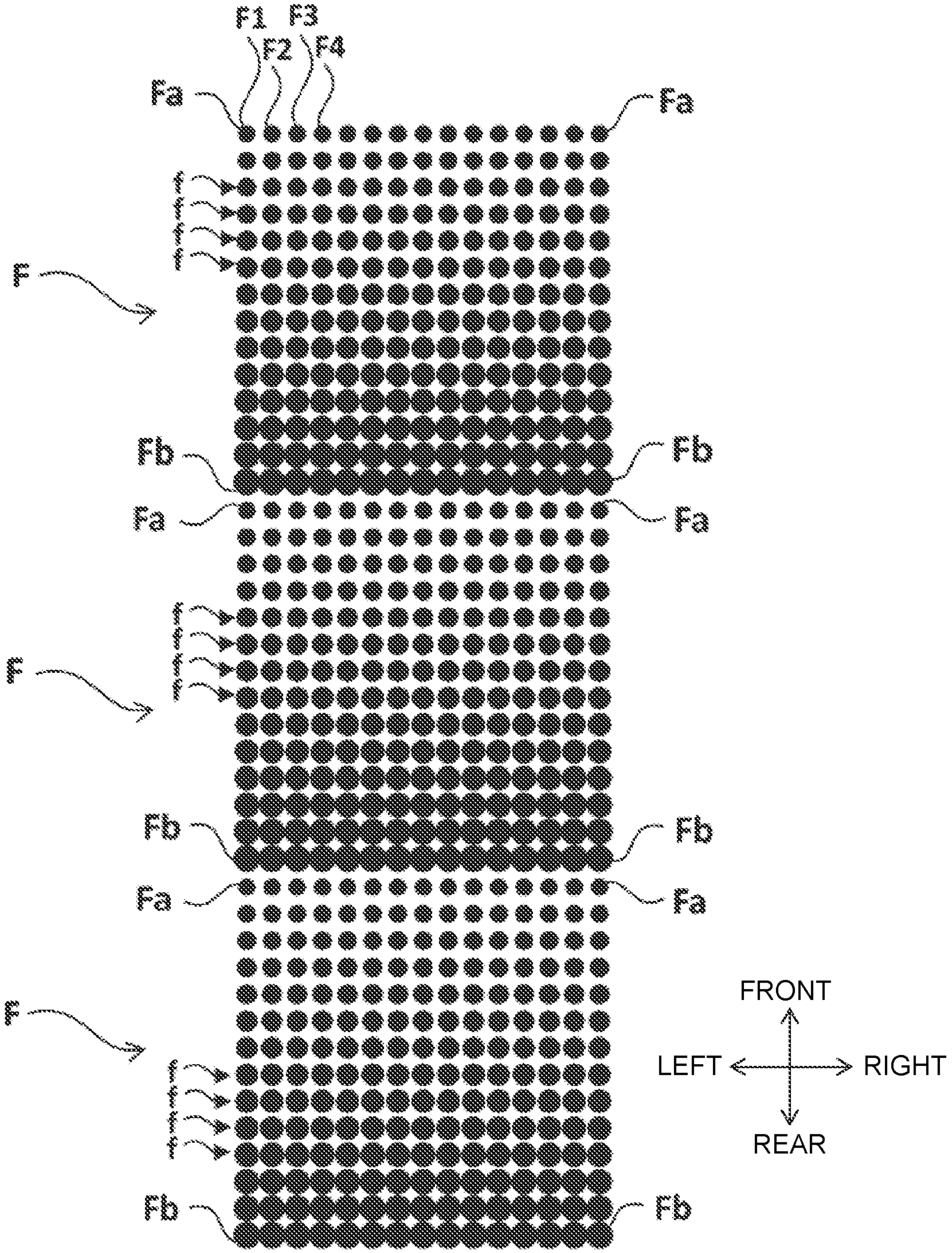
FIG. 14 is a view depicting dots of the ink of discharge amounts based on image data.

Specifically, the controller 50 obtains the discharge amount of the ink from the image data, and controls each of the driving elements 24 by control data in accordance with the discharge amount. With this, as depicted in FIG. 14, the ink is discharged from the nozzles 21 by the driving of the driving elements 24, dots of the ink are formed in the print medium A, and an image is printed by the dots. In this case, a plurality of dots F formed by one time of a pass (one pass) are aligned or arranged side by side in the front-rear direction since the ink is discharged from the nozzles 21 which are arranged side by side in the front-rear direction in the head 20, and the plurality of dots F formed by one pass are arranged side by side in the left-right direction since the head 20 discharges the ink from the respective nozzles 21 while the head 20 is moving in the left-right direction. The plurality of dots F aligned in the left-right direction form a dot array (dot row) f.

Here, by the generation of heat by the driving elements 24 and the supply of the ink from the sub tank 15 to the manifold 22, the temperature of the ink becomes higher at a location further on the rear side in the manifold 22. Accompanying with this, in an assumed case that the driving elements 24 are driven by the medium-sized droplet signal so as to discharge the ink from the nozzles 21 communicating with the manifold 22 and aligned in the front-rear direction, the discharge amount of the ink becomes greater in a nozzle 21 which is located further on the rear side. Accordingly, as indicated in FIG. 14, in dots F formed by the forwarding route pass, the size of an upstream forwarding route dot Fa formed of the ink from the upstream nozzle 21*a* which is the frontmost nozzle is smallest, the size of a dot F becomes greater further toward the rear side, and the size of a downstream forwarding route dot Fb formed of the ink from the downstream nozzle 21*b* which is the rearmost nozzle is greatest. Regarding dots F formed by the returning route pass, the size of a dot F becomes greater further toward the rear side, in a similar manner to the dots F formed by the forwarding route pass. In such a manner, the dots become greater further toward the rear side, and the density of the image constructed by the dots becomes greater further toward the rear side. In view of this, the controller 50 executes the density correcting operation so as to correct the discharge amounts of the ink, thereby lowering any unevenness of the density in the image.

In the density correcting operation, based on a predetermined corresponding relationship indicated by an example of FIG. 15, the controller 50 corrects the discharge amounts based on the temperature difference of the ink. In a table of FIG. 15, a correction ratio (%) of the discharge amount with respect to the temperature difference of the ink and the order of the nozzle 21 is determined previously and is stored in the storing part 53. In this table, the temperature difference of the ink between a front part and a rear part in the manifold 22 is indicated in the lateral direction of the table; as the temperature difference is greater, the correction ratio of the discharge amount is greater. Further, the vertical direction of the table indicates the orders of the nozzles which are arranged in order from the front, along the manifold 22; a 1st nozzle 21 is an upstream nozzle 21*a* which is arranged frontmost. The order of a nozzle 21 which is arranged further on the rear side becomes greater, and a last, 79th nozzle 21 is a downstream nozzle 21*b* which is arranged rearmost. For example, in a case that the temperature difference is 4° C., the correction ratio with respect to the 1st to 9th nozzles 21 is 0%, the correction ratio with respect to the 10th to 39th nozzles 21 is 1%, the correction ratio with respect to the 40th to 59th nozzles 21 is 2%, and the correction ratio with respect to the 60th to 79th nozzles 21 is 3%. In such a manner, as the order of a certain nozzle 21 becomes greater, the distance in the front-rear direction from the upstream nozzle 21*a* to the certain nozzle 21 becomes greater, and since the temperature difference between the upstream nozzle 21*a* and the certain nozzle 21 becomes greater, the correction ratio of the discharge amount with respect to the certain nozzle 21 is great.

The correction ratio of the discharge amount is a ratio of the number (quantity) of a dot which is included in dots based on the image data and aligned in the left-right direction and regarding which the discharge amount of the ink forming the dot is to be corrected, and is represented by: [the quantity of dot]/[the quantity of dots based on the image data]×100. The quantity of dots based on the image data is quantity of dots F formed by the ink from a certain nozzle 21 in one pass, and is quantity of the dot F in one piece of the dot row F.

Figure 16A:
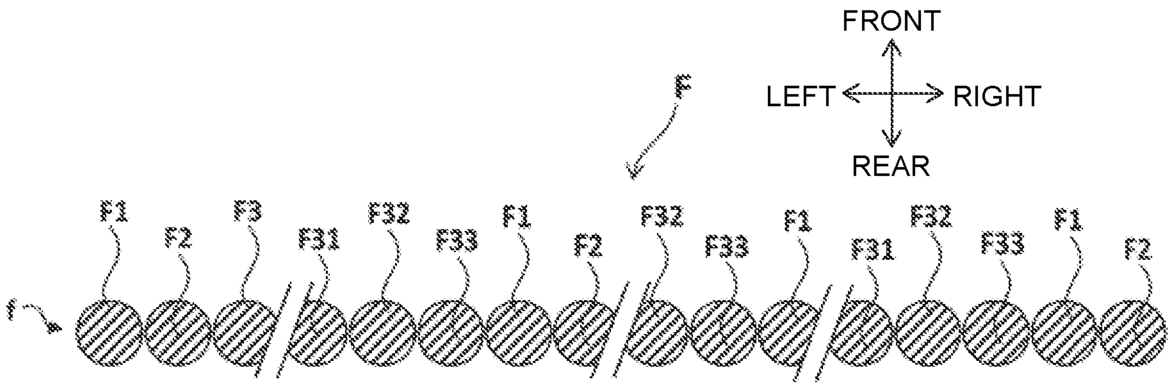
FIG. 16A is a view depicting a dot row of dots based on image data.
Figure 16B:
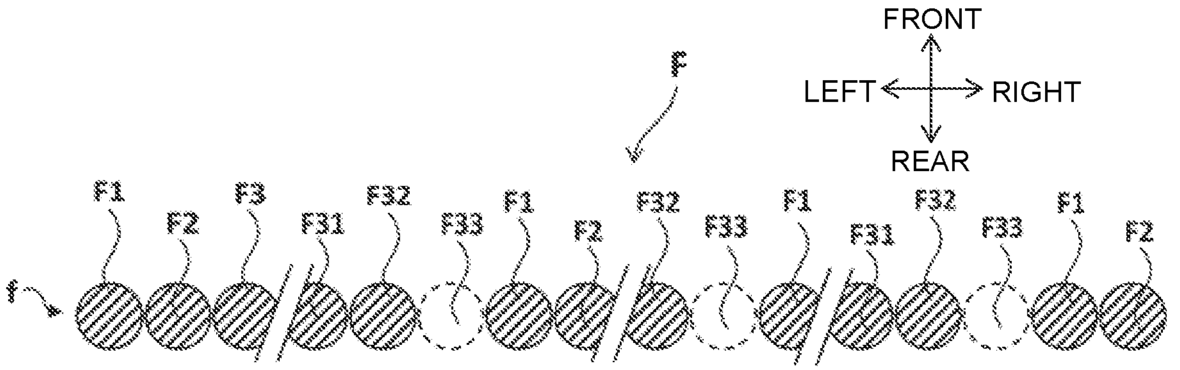
FIG. 16B is a view depicting a dot row of dots including dots of which discharge amount is corrected to 0 and which correspond to the correction ratio of FIG. 15.

For example, the controller 50 associates the orders of dots F based on the image data, aligned from the front to the rear and included in the dots F which are to be formed in one pass, as depicted in FIG. 14, with the order of the nozzles 21 aligned from the front to the rear along the manifold 22. The controller 50 corrects the discharge amount of the ink based on the image data by a correction ratio which is in accordance with the temperature difference and the order of the nozzle 21. For example, in a case that the correction ratio is 3%, the controller 50 corrects the discharge amount to 0 from the discharge amount based on the image data, with respect to every 33nd dot F33 among the dots F in a dot row fin FIG. 16A. Accordingly, the ink is not discharged from the nozzle 21 at a 33rd discharge timing; dots F33 corresponding to the 33rd discharge timing are not formed in the dot row f on the print medium A, as indicated in FIG. 16B.

Further, the controller 50 makes the ratio of correcting the discharge amount to 0 to be greater as the order of the nozzle 21 is greater, namely, makes the ratio of correcting the discharge amount to 0 to be greater with respect to a nozzle 21 located further on the rear side. With this, the ratio by which the dot is not formed is made greater regarding a dot row f located further on the rear side. Accordingly, it is possible to lower the density at a rear part or portion of the image, thereby making is possible to uniformize the density in the front-rear direction of the image.

<Printing Method>

Figure 17A:
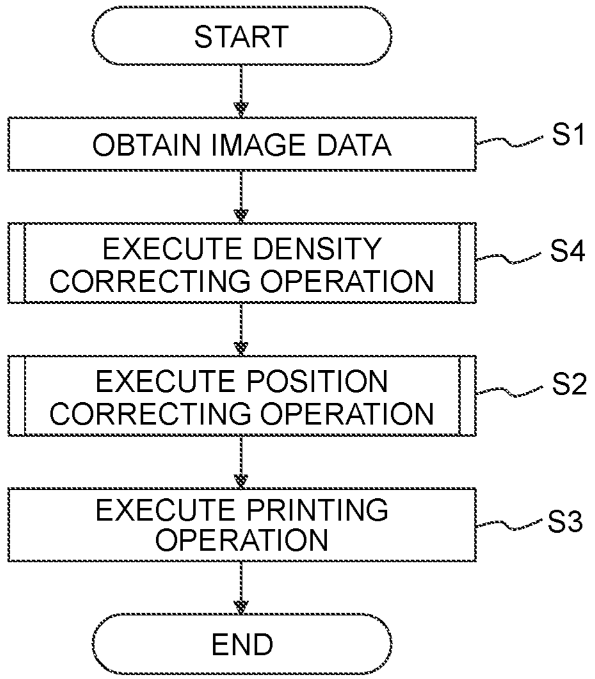
FIG. 17A is a flow chart indicating an example of a printing method for a printing apparatus using the corresponding relationship of FIG. 15.

A printing method of the printing apparatus 10 is executed by the controller 50 along a flow chart depicted in an example of FIG. 17A. In the flow chart of FIG. 17A, the density correcting operation is executed between step S1 and step S2 in the flow chart of FIG. 6A. The density correcting operation is executed by the controller 50 along a flow chart depicted in an example of FIG. 17B.

Specifically, the controller 50 firstly obtains image data from an external apparatus (step S1). The controller 50 executes the density correcting operation of correcting the discharge amount of the ink based on the image data (step S4). Here, in the density correcting operation of FIG. 17B, the controller 50 obtains a discharge amount of the ink from the image data, regarding each of dots to be formed by the ink (step S41). Further, the controller 50 obtains the temperature difference of the ink in the manifold 22, based on the temperature detected by the first temperature sensor 13. Then, the controller 50 obtains, with respect to each of the nozzles 21, the correction ratio of the discharge amount corresponding to the temperature difference and the order of each of the nozzles 21, from the predetermined corresponding relationship indicated in FIG. 15 (step S42). The controller 50 corrects the discharge amount of the ink to 0 from the discharge amount based on the image data, with respect to the dot(s) corresponding to the correction ratio among the dots to be formed by the ink discharged from each of the nozzles 21 in one pass (step S43).

Then, the controller 50 selects a waveform signal for each of the dots F, in accordance with the discharge amount corrected by the density correcting operation and the discharge amount which is different from the corrected discharge amount and which is based on the image data to thereby generate waveform selection data. The controller 50 allocates the waveform selection data to each of the driving elements 24 and the driving timing, thereby generating, with respect to each of the passes, control data of each of the driving elements 24. Then, the controller 50 executes the position correcting operation for correcting the discharge timing of the ink which is in accordance with the driving timing of each of the driving elements 24 (step S2).

Then, the controller 50 executes the printing operation while driving each of the driving elements 24 by the control data in which the discharge amount of the ink and the discharge timing of the ink are corrected (step S3). With this, as the temperature difference of the ink between the front part and the rear part in the manifold 22 is greater, and regarding a certain nozzle 21 included in the nozzles 21 aligned along the manifold 22 and located further on the rear side, the correction ratio of the discharge amount becomes greater. Accordingly, the ratio by which the ink is not discharged in one pass becomes greater regarding the certain nozzle 21 included in the nozzles 21 aligned along the manifold 22 and located further on the rear side, and the ratio by which the dots are not formed becomes greater regarding a certain dot row f included in the dot rows f arranged side by side in the front-rear direction and located further on the rear side. Accordingly, it is possible to lower such an unevenness of the density in the image that the density is increased further on the rear side of the image due to the temperature difference of the liquid in the head 20, and to reduce any lowering in the image quality.

Sixth Modification

In a printing apparatus 10 of a sixth modification, the dots include a first dot and a second dot greater than the first dot. In the density correcting operation, the controller 50 corrects the discharge amount of the ink to 0 with respect to dots which are included in all the dots including the first dot and the second dot and which correspond to a ratio based on the temperature difference. Note that in the following description, although the first dot is referred to as a "small dot Fs" and the second dot is referred to as a "large dot Fl", the first dot and the second dot are not limited to or restricted by these dots Fs and Fl.

Specifically, the controller 50 obtains the discharge amount of the ink with respect to each of the dots to be formed by the ink so that the discharge amount of the ink becomes greater as a pixel value of the gradation of the image data is smaller. With this, a medium dot is formed by a medium-sized droplet of the ink with respect to a pixel value within a predetermined range, a small dot Fs is formed by a small-sized droplet of the ink with respect to a pixel value smaller than the predetermined range, and a large dot Fl is formed by a large-sized droplet of the ink with respect to a pixel value greater than the predetermined range. In an example of FIG. 18A, the ink is discharged based on the image data from a certain nozzle 21 by the forwarding route pass, and the small dot Fs and the large dot Fl are aligned in order from the right each at a size in according with the gradation.

Figure 17B:
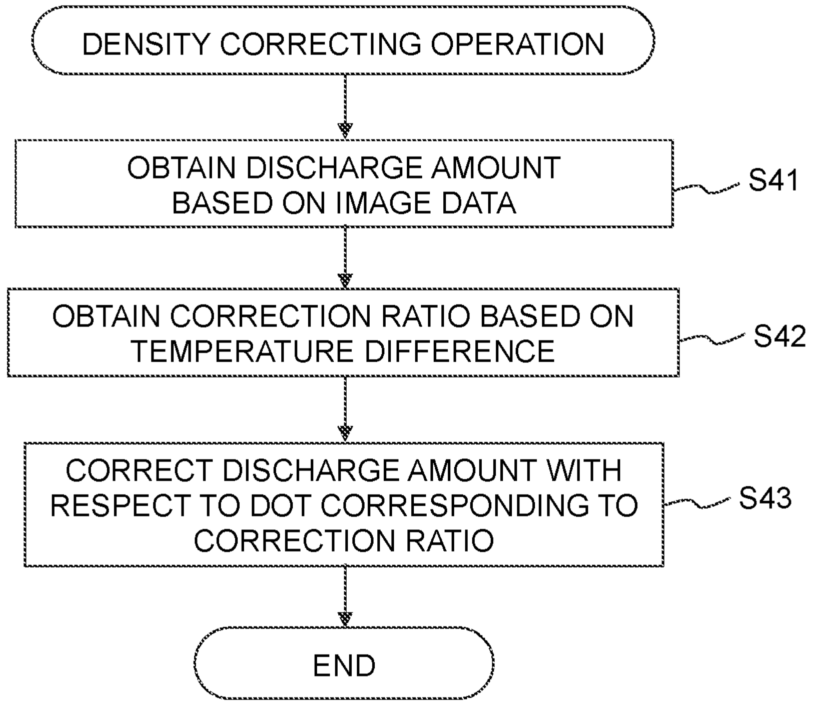
FIG. 17B is a flow chart indicating an example of a position correcting operation.

In view of this, in step S43 of FIG. 17B, the controller 50 corrects the discharge amount with respect to a dot F corresponding to the correction ratio based on the temperature difference to 0 from the discharge amount which is based on the image data. For example, the controller 50 obtains, based on the predetermined corresponding relationship of FIG. 15, the correction ratio corresponding to the temperature difference of the ink, with respect to the order of each of the nozzles 21. In a case that the temperature difference is 4° C., the controller 50 corrects the discharge amount of the ink to 0 with respect to dots which corresponds to the correction ratio 3% among the dots based on the image data with respect to each of the 60th to 79th nozzles 21. In this situation, as depicted in FIG. 18B, among all the dots F including the small dot Fs and the large dot Fl, the controller 50 corrects the discharge amount with respect to every 33rd dot F from the small-sized droplet or the large-sized droplet to 0. Accordingly, the ink is not discharged from the nozzle 21 at every 33rd timing, and in the dot row f, the dots F33 each corresponding to the 33rd discharge timing are not formed on the print medium A. The correction ratio is greater as the temperature difference in the manifold 22 is greater, and the correction ratio is greater regarding a dot row f which is located further on the rear side among the dot rows f, thereby making it possible to lower the density at a rear part or portion of the image, and to uniformize the density in the front-rear direction of the image.

Seventh Modification

In a printing apparatus 10 according to a seventh modification, the dots include a first dot and a second dot greater than the first dot. In the density correcting operation, the controller 50 corrects the discharge amount of the ink to 0 with respect to a first dot included in the first dot and corresponding to a ratio based on the temperature difference, and the controller 50 corrects the discharge amount of the ink to 0 with respect to a second dot included in the second dot and corresponding to a ratio based on the temperature difference.

Figure 18A:
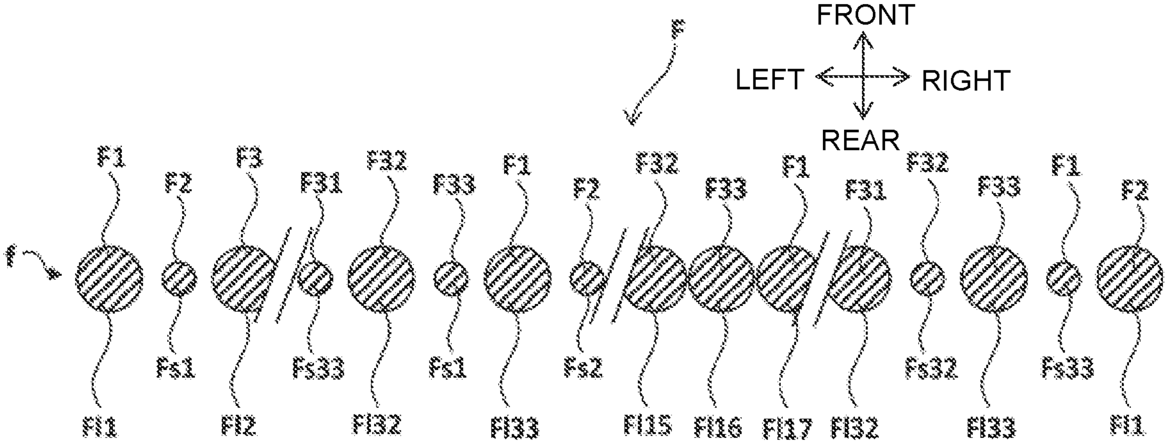
FIG. 18A is a view depicting a dot row of dots based on image data.
Figure 18B:
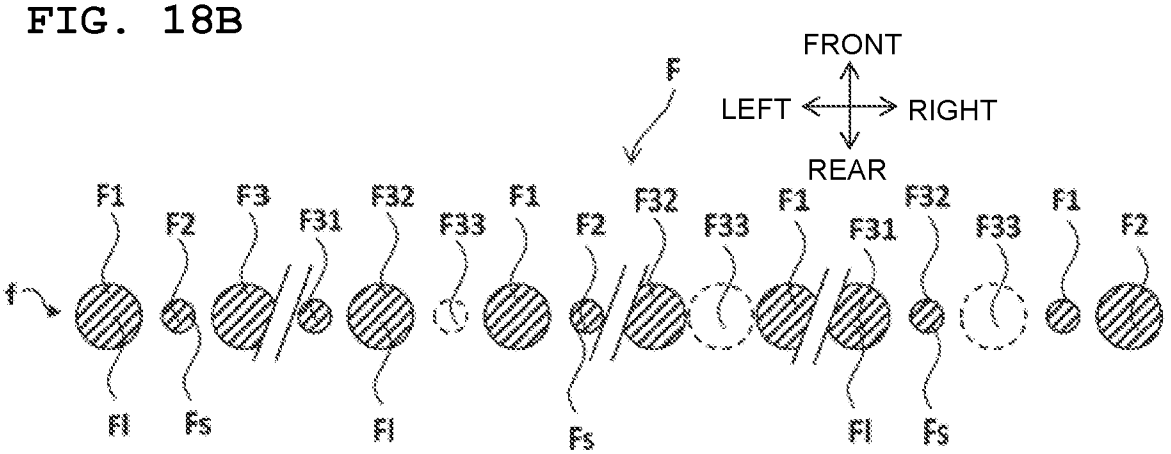
FIG. 18B is a view depicting a dot row of dots including dots of which discharge amount is corrected to 0 by a printing apparatus.

Specifically, in the example of FIG. 18A, in a case that the ink is discharged based on the image data from a certain nozzle 21 by the forwarding route pass, small dots Fs and large dots Fl are formed in order from the right in a dot row f. In view of this, for example, in step S42 of FIG. 17B, the controller 50 obtains, for example, based on the predetermined corresponding relationship of FIG. 15, the correction ratio corresponding to the temperature difference of the ink, with respect to the order of each of the nozzles 21. In a case that the temperature difference is 4° C., in step S43, the controller 50 corrects, regarding each of the 60th to 79th nozzles 21, the discharge amount of the ink to 0 with respect to dots which correspond to the correction ratio 3% among the dots based on the image data.

Figure 18C:
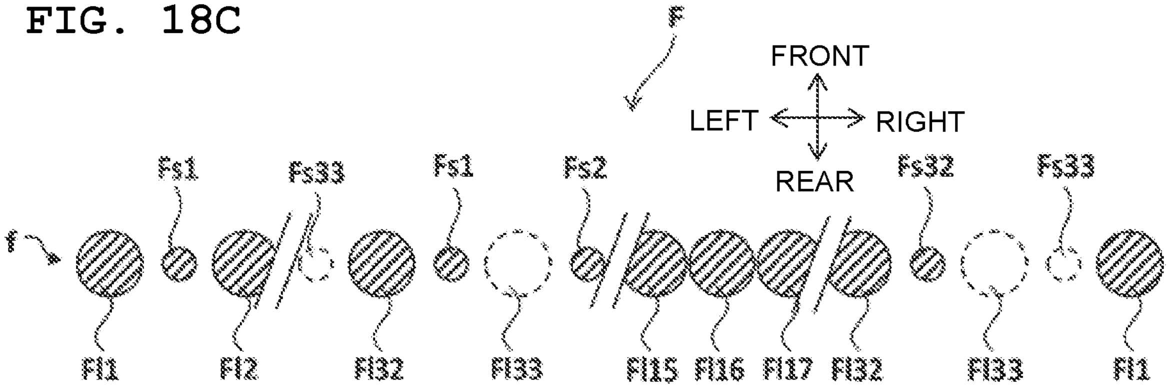
FIG. 18C is a view depicting a dot row of dots including dots of which discharge amount is corrected to 0 by a printing apparatus.

In this situation, as depicted in FIG. 18C, the controller 50 corrects the discharge amount, in order from a first small dot Fs1 with respect to every 33rd small dot Fs33 among the small dots Fs in the dot row f, from the small-sized droplet to 0. Further, as depicted in FIG. 18C, the controller 50 corrects the discharge amount, in order from a first large dot Fl1 with respect to every 33rd large dot Fl33 among the large dots Fl in the dot row f, from the large-sized droplet to 0. In such a manner, with respect to each of the dot F of the small dot Fs and the dot F of the large dot Fl, the ink is not discharged from the nozzle 21 at the 33rd discharge timing, and the small dot Fs and the large dot Fl corresponding to the 33rd timing in the dot row f are not formed on the print medium A. With this, it is possible to lower the density at a rear part or portion of the image, and to uniformize the density in the front-rear direction of the image.

Eighth Modification

In a printing apparatus 10 according to an eighth modification, the dots F includes a fifth dot and a sixth dot which are continuously aligned in the first direction, and a seventh dot which is continuously aligned with respect to the fifth dot in the second direction. In other words, there is no other dot present between the fifth and sixth dots in the first direction. Further, there is no other dot present between the fifth and seventh dots in the second direction. In the density correcting operation, the controller 50 corrects the discharge amount of the ink with respect to the seventh dot, rather than the fifth dot, so that the discharge amounts of the ink with respect to both of the fifth dot and the sixth dot are not corrected.

Figure 19A:
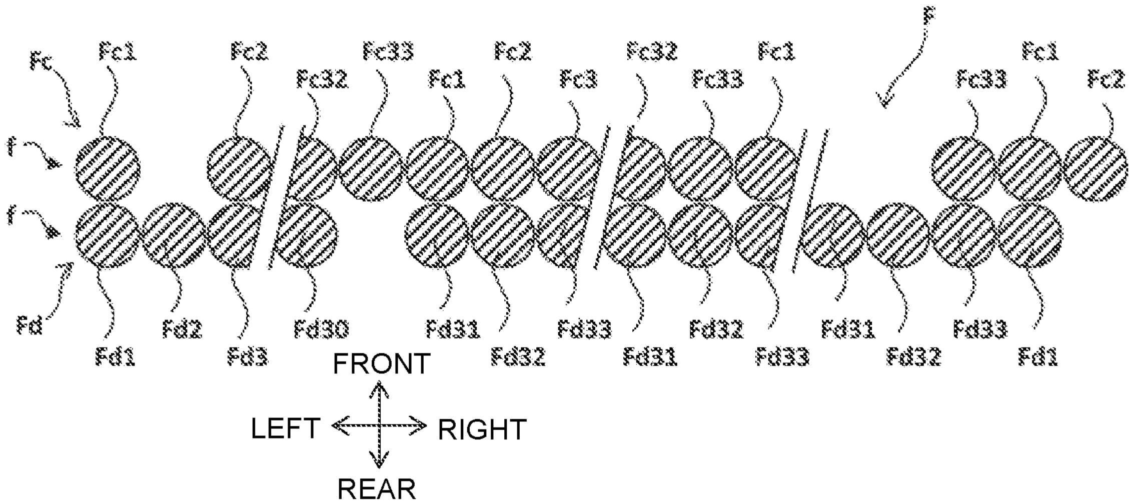
FIG. 19A is a view depicting dot rows of dots based on image data.

Specifically, as depicted in FIG. 3, the plurality of nozzles 21 communicating with the manifold 22 include a front nozzle 21*c* and a rear nozzle 21*d* which is arranged continuously with respect to the front nozzle 21*c* on the rear side of the front nozzle 21*c*. In other words, there is no other nozzle present between the front nozzle 21*c* and the rear nozzle 21*d*. In an example of FIG. 19A, in a case that the ink is discharged from the front nozzle 21*c* and the rear nozzle 21*d* in accordance with the image data by the forwarding route pass, front dots Fc by the front nozzle 21*c* are aligned from the right side in order from a first front dot Fc1, and rear dots Fd by the rear nozzle 21*d* are aligned from the right side in order from a first rear dot Fd1. A dot row fin which the rear dot Fd1 are aligned in the left-right direction is arranged on the rear side of a dot row fin which the front dots Fc are aligned in the left-right direction. In other words, there is no other dot row f present in the front-rear direction between the dot row fin which the rear dot Fd1 belongs and the dot row fin which the front dot Fc1 belongs.

Figure 19B:
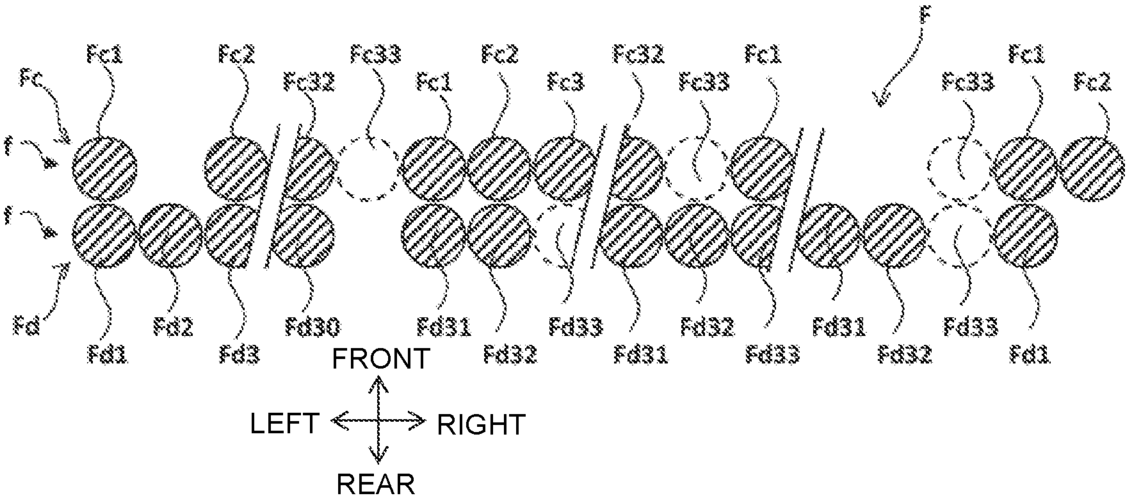
FIG. 19B is a view depicting dot rows of dots wherein the dots include dots of which discharge amount is corrected to 0 and which are arranged side by side in a front-rear direction.

In view of this, in step S43 of FIG. 17B, for example, the controller 50 obtains, based on the predetermined corresponding relationship of FIG. 15, the correction ratio corresponding to the temperature difference of the ink, with respect to the order of each of the nozzles 21. In step S43, the controller 50 corrects the discharge amount with respect to a dot F, which are included in the dots F based on the image data and which corresponds to the correction ratio based on the temperature difference to 0 from the discharge amount which is based on the image data. For example, in a case that the correction ratio is 3% and that the discharge amount based on the image data is the middle-sized droplet, the controller 50 corrects, in order from the first front dot Fc1 with respect to every 33rd front dot Fc33 among the front dots Fc based on the image data, from the medium-sized droplet to 0, as in an example of FIG. 19B. Further, the controller 50 corrects, in order from the first rear dot Fd1 with respect to every 33rd rear dot Fd33 among the rear dots Fd based on the image data, from the medium-sized droplet to 0, as in the example of FIG. 19B. With this, there is such a case that a front dot Fc33 of which discharge amount is corrected and a rear dot Fd33 of which discharge amount is corrected are arranged continuously in the front-rear direction. In such a case, an area or region in each of which the dot F is not formed are arranged side by side in the front-rear direction, and since there is no other dot present between the front dot Fc33 of which discharge amount is corrected and the rear dot Fd33 of which discharge amount is corrected, such area appears to be a so-called white streak or blank.

Figure 19C:
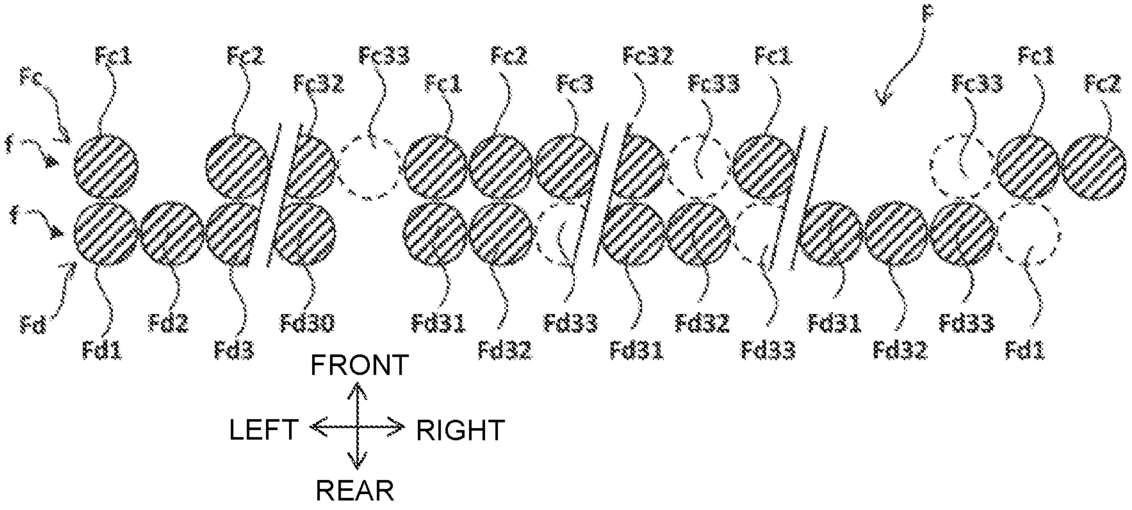
FIG. 19C is a view depicting dot rows of dots including dots of which discharge amount is corrected to 0 by a printing apparatus.

In view of this, as in an example of FIG. 19C, regarding the front dot Fc33 and the rear dot Fd33 which are continuously arranged in the front-rear direction, the controller 50 corrects the discharge amount from the middle-sized droplet to 0 with respect to a rear dot Fd1 which is continuously arranged on the right side of the rear dot Fd33, without correcting the discharge amount with respect to the rear dot Fd33. With this, since the dots F of which discharge amounts are corrected to 0 are not arranged side by side in the front-rear direction, any generation of the while streak is suppressed, and any lowering in the image quality due to the white streak is reduced.

Note that it is allowable that the controller 50 corrects the discharge amount with respect to a rear dot Fd32, which is arranged continuously on the left side of the rear dot Fd33, from the middle-sized droplet to 0. Alternatively, it is allowable that, regarding the front dot Fc33 and the rear dot Fd33 which are continuously arranged in the front-rear direction, the controller 50 corrects the discharge amount from the middle-sized droplet to 0 with respect to a front dot Fc1 which is continuously arranged on the right side of the front dot Fc33, without correcting the discharge amount with respect to the front dot Fc33 from the middle-sized droplet to 0.

Nineth Modification

In a printing apparatus 10 according to a nineth modification, the dots include an eighth dot, a nineth dot and a tenth dot which are continuously aligned in the second direction. In other words, there is no other dot present between the eighth and ninth dots in the second direction. Further, there is no other dot present between the nineth and tenth dots in the second direction. In the density correcting operation, the controller 50 corrects the discharge amount of the ink with respect to the tenth dot, rather than the nineth dot, so that the discharge amounts of the ink with respect to both of the eighth dot and the nineth dot are not corrected.

Specifically, in the example of FIG. 20A, in a case that the ink is discharged based on the image data from a certain nozzle 21 by the forwarding route pass, small dots Fs and large dots Fl are formed in order from the right in a dot row f. In view of this, for example, in step S42 of FIG. 17B, the controller 50 obtains, based on the predetermined corresponding relationship of FIG. 15, the correction ratio corresponding to the temperature difference of the ink, with respect to the order of each of the nozzles 21. In a case that the temperature difference is 4° C., in step S43, the controller 50 corrects, with respect to each of the 60th to 79th nozzles 21, the discharge amount of the ink to 0 with respect to dots, which are included in the dots F based on the image data and which correspond to the correction ratio 3%. With this, as depicted in FIG. 20B, the controller 50 corrects the discharge amount with respect to every 33rd small dot Fs33 among the small dots Fs in the dot row f based on the image data, from the small-sized droplet to 0. Further, as depicted in FIG. 20B, the controller 50 corrects the discharge amount with respect to every 33rd large dot Fl33 among the large dots Fl in the dot row f based on the image data, from the large-sized droplet to 0. With this, there is such a case that a small dot Fs33 of which discharge amount is corrected and a large dot Fl33 of which discharge amount is corrected are arranged continuously in the left-right direction. In such a case, an area or region in each of which the dot F is not formed are arranged side by side in the left-right direction, and since there is no other dot present between the small dot Fs33 of which discharge amount is corrected and the large dot Fl33 of which discharge amount is corrected, the density is locally lowered as a result.

In view of this, as in an example of FIG. 20C, regarding the small dot Fs33 and the large dot Fl33 which are continuously arranged in the left-right direction, the controller 50 corrects the discharge amount from the small-sized droplet to 0 with respect to a small dot Fs1 which is continuously arranged in the left-right direction with the small dot Fs33, without correcting the discharge amount with respect to the small dot Fs33. With this, since the dots F of which discharge amounts are corrected to 0 are not arranged side by side in the left-right direction, namely, since there is the small dot Fs33 is present between the large dot Fl33 and the small dot Fs1, any local lowering of the density is suppressed, and any lowering in the image quality due to the local lowering of the density is reduced. Note that it is also allowable that the controller 50 corrects the discharge amount from the large-sized droplet to 0 with respect to a large dot Fl32 which is arranged continuously in the left-right direction with the large dot Fl33, instead of the large dot Fl33.

Tenth Modification

In a tenth modification, the dots include a third dot which is on the upstream in the first direction with respect to a predetermined position and a fourth dot which is on the downstream in the first direction with respect to the predetermined position. In the density correcting operation, the controller 50 corrects the discharge amount of the ink with respect to the third dot so that a size, of the third dot, which corresponds to a ratio based on the temperature difference becomes greater than a size, of the third dot, which is based on the temperature difference. In the density correcting operation, the controller 50 corrects the discharge amount of the ink with respect to the fourth dot so that a size, of the fourth dot, which corresponds to the ratio based on the temperature difference becomes to be smaller than a size, of the fourth dot, which is based on the temperature difference.

Specifically, in the density correcting operation, in step S42 of FIG. 17B, the controller 50 obtains, based on a table of a predetermined corresponding relationship as depicted in an example of FIG. 21, the correction ratio based on the temperature difference of the ink, with respect to the order of each of the nozzles 21. In the table of FIG. 21, a correction ratio (%) of the discharge amount with respect to the temperature difference of the ink and the order of the nozzle 21 is determined previously in the table and is stored in the storing part 53. In this table, the temperature difference of the ink between a front part and a rear part in the manifold 22 is indicated in the lateral direction of the table; as the temperature difference is greater, the correction ratio of the discharge amount is greater.

Further, the orders of the respective nozzles 21, which are aligned in order from the front along the manifold 22, are indicated in the vertical direction of the graph. The correction ratio with respect to a nozzle 21 of a predetermined order is 0%; as the order of a certain nozzle 21 is smaller than the predetermined order, and as the order of a certain nozzle 21 is greater than the predetermined order, the correction ratio of the discharge amount is greater. For example, the nozzle 21 of the predetermined order includes a nozzle 21 which is located in the center in the front-rear direction, or a plurality of nozzles 21 including this nozzle 21 located in the center. In a case that the temperature difference is 4° C., the nozzle of the predetermined order is 30th to 49th nozzles 21, and the correction ratio with respect to the 30th to 49th nozzles 21 is 0%. The correction ratio with respect to 20th to 29th nozzles 21 of which orders are smaller than the predetermined order and the correction ratio with respect to 50th to 59th nozzles 21 of which orders are greater than the predetermined order are each 1%. Further, the correction ratio with respect to 10th to 19th nozzles 21 of which orders are smaller than those of the 20th to 29th nozzles 21 and the correction ratio with respect to 60th to 69th nozzles 21 of which orders are greater than those of the 50th to 59th nozzles 21 are each 2%. Furthermore, the correction ratio with respect to 1th to 9th nozzles 21 of which orders are smaller than those of the 10th to 19th nozzles 21 and the correction ratio with respect to 70th to 79th nozzles 21 of which orders are greater than those of the 60th to 69th nozzles 21 are each 3%.

In step S43 of FIG. 17B, the controller 50 corrects the discharge amount of the ink with respect to the nozzles 21 of which order is smaller than the predetermined order, namely, with respect to the nozzles 21 which are located on the front side of the predetermined position in the front-rear direction so that the discharge amount is greater than the discharge amount based on the image data. Further, the controller 50 corrects the discharge amount of the ink with respect to the nozzles 21 of which order is greater than the predetermined order, namely, with respect to the nozzles 21 which are located on the rear side of the predetermined position in the front-rear direction so that the discharge amount is smaller than the discharge amount based on the image data.

For example, in a case that the temperature difference is 4° C., the controller 50 does not correct the discharge amount of the ink from the 30th to 49th nozzles 21. On the other hand, with respect to the 1st to 9th nozzles 21, and with respect to the 60th to 79th nozzles 21, the controller 30 corrects the discharge amount of the ink with respect to dots which correspond to a correction ratio 3% among the dots which are based on the image data, as indicated in FIG. 22B. In this situation, with respect to each of the 1st to 9th nozzles 21, the controller 50 corrects the discharge amount from the small-sized droplet to the large-sized droplet so that a 33rd small dot Fs33 based on the image data as depicted in FIG. 22B becomes to be a large dot Fl33 as depicted in FIG. 22A. Further, with respect to each of the 60th to 79th nozzles 21, the controller 50 corrects the discharge amount from the large-sized droplet to the small-sized droplet so that a 33rd large dot Fl33 based on the image data as depicted in FIG. 22B becomes to be a small dot Fs33 as depicted in FIG. 22C.

With this, in the image, the size of a dot F on the front side with respect to the predetermined position is made to be great, and the ratio of the dot of which size is made to be great is greater as the temperature difference is greater and as the position of the dot F is further on the front side. Further, in the image, the size of a dot F on the rear side with respect to the predetermined position is made to be small, and the ratio of the dot of which size is made to be small is greater as the temperature difference is greater and as the position of the dot F is further on the rear side. With this, the density is increased further on the front side of the image, and the density is decreased further on the rear side in the image, thereby uniformizing the density in the front-rear direction of the image.

Eleventh Modification

In a printing apparatus 10 according to an eleventh modification, the controller 50 corrects the discharge amount of the ink with respect to dots so that a size of a dot which is included in a plurality of dots and which correspond to a ratio based on the temperature difference becomes greater than the size of the dot which is based on the image data.

Specifically, in the density correcting operation, in step S42 of FIG. 17B, the controller 50 obtains a correction ratio based on the temperature difference for each of the nozzles 21, based on a table of a predetermined corresponding relationship as depicted in an example of FIG. 23. In the table of FIG. 23, a correction ratio (%) of the discharge amount with respect to the temperature difference of the ink and the order of the nozzle 21 is determined previously and is stored in the storing part 53. In this table, the temperature difference of the ink between a front part and a rear part in the manifold 22 is indicated in the lateral direction of the table; as the temperature difference is greater, the correction ratio of the discharge amount is greater.

Further, the vertical direction of the table indicates the orders of the nozzles which are arranged in order from the front, along the manifold 22. For example, in a case that the temperature difference is 4° C., the correction ratio with respect to the 1st to 9th nozzles 21 is 4%, the correction ratio with respect to the 10th to 29th nozzles 21 is 3%, the correction ratio with respect to the 30th to 49th nozzles 21 is 2%, the correction ratio with respect to the 50th to 69th nozzles 21 is 1%, and the correction ratio with respect to the 70th to 79th nozzles 21 is 0%. In such a manner, as the order of a certain nozzle 21 becomes smaller, namely, as the certain nozzle 21 is located further on the front side, the certain nozzle 21 is closer to the upstream nozzle 21*a*, and the correction ratio of the discharge with respect to the certain nozzle 21 is great.

In step S43 of FIG. 17B, for example, in a case that the temperature difference is 4° C., with respect to the discharge amount of the ink from each of the 10th to 29th nozzles 21, the controller 50 corrects the discharge amount of the ink so that the discharge amount with respect to a dot, which corresponds to the correction ratio 3% among the dots based on the image data as depicted in FIG. 22B, becomes greater than the discharge amount based on the image data. Namely, in a dot row f, the controller 50 corrects the discharge amount, of a 33rd small dot Fs33 based on the image data as depicted in FIG. 22B, from a small-sized droplet to a large-sized droplet, so that the 33rd small dot Fs33 becomes to be a large dot Fl33 as depicted in FIG. 22A. In this situation, in a case that the 33rd dots F among all the dots included in the dot row f is a small-sized dot, it is allowable to correct the discharge amount thereof from a small-sized droplet to a large-sized droplet. Further, it is also allowable to correct the discharge amount with respect to 33rd small dots among small dots included in the dot row r, from a small-sized droplet to a large-sized droplet. In such a manner, the size of a dot F which is located on the front side in the image is great, and the ratio of the dot of which size is made to be great is increased as the temperature difference is greater and as the position of the dot F is further on the front side. With this, since the density is increased further on the front side of the image, thereby making is possible to uniformize the density in the front-rear direction of the image.

Note that also in the tenth modification and the eleventh modification, in a case that the discharge amount of each of the fifth dot and the sixth dot which are continuously arranged in the first direction is corrected, there is such a fear that a so-called black streak might appear since there is no blank present between the fifth and sixth dots. According, as in the eighth modification, in the density correcting operation, the controller 50 corrects the discharge amount of the ink with respect to the seventh dot, rather than the fifth dot, so that the discharge amounts of the ink with respect to both of the fifth dot and the sixth dot are not corrected. With this, it is possible to lower any generation of the black streak, thereby making it possible to suppress any lowering of the image quality due to the black streak.

Twelfth Modification

In a printing apparatus 10 according to a twelfth modification, the controller 50 corrects, in the density correcting operation, the discharge amount of the ink with respect to dots so that a size of a dot which is included in a plurality of dots and which corresponds to a ratio based on the temperature difference becomes to be smaller than the size of the dot which is based on the image data.

Specifically, in the density correcting operation, in step S42 of FIG. 17B, the controller 50 obtains a correction ratio based on the temperature difference for each of the nozzles 21, based on a table of a predetermined corresponding relationship as depicted in an example of FIG. 24. In the table of FIG. 24, a correction ratio (%) of the discharge amount with respect to the temperature difference of the ink and the order of the nozzle 21 is determined previously and is stored in the storing part 53. In this table, the temperature difference of the ink between a front part and a rear part in the manifold 22 is indicated in the lateral direction of the table; as the temperature difference is greater, the correction ratio of the discharge amount is greater.

Further, the vertical direction of the table indicates the orders of the nozzles which are arranged in order from the front, along the manifold 22. For example, in a case that the temperature difference is 4° C., the correction ratio with respect to the 1st to 9th nozzles 21 is 0%, the correction ratio with respect to the 10th to 39th nozzles 21 is 1%, the correction ratio with respect to the 40th to 59th nozzles 21 is 2%, and the correction ratio with respect to the 60th to 79th nozzles 21 is 3%. In such a manner, as the order of a certain nozzle 21 becomes greater, namely, as the certain nozzle 21 is located further on the rear side, the certain nozzle 21 is further away (further separated) from the upstream nozzle 21*a* and the temperature difference with respect to the upstream nozzle 21*a* becomes greater, and thus the correction ratio of the discharge amount for the certain nozzle 21 is great.

In step S43 of FIG. 17B, for example, in a case that the temperature difference is 4° C., with respect to the discharge amount of the ink from each of the 60th to 79th nozzles 21, the controller 50 corrects the discharge amount of the ink so that the discharge amount with respect to a dot, which corresponds to the correction ratio 3% among the dots based on the image data as depicted in FIG. 22B, to be smaller than the discharge amount based on the image data. Namely, in a dot row f, the controller 50 corrects the discharge amount, of a 33rd large dot Fl33 based on the image data as depicted in FIG. 22B, from a large-sized droplet based on the image data to a small-sized droplet, so that the 33rd large dot Fl33 becomes to be a small dot Fs33 as depicted in FIG. 22C. In this situation, in a case that each of the 33rd dots F among all the dots F included in the dot row f is a large-sized dot, it is allowable to correct the discharge amount thereof from a large-sized droplet to a small-sized droplet. Further, it is also allowable to correct the discharge amount with respect to 33rd large dots among large dots F included in the dot row r, from a large-sized droplet to a small-sized droplet. In such a manner, the size of a dot F which is located on the rear side in the image is made to be small, and the ratio of the dot of which size is made to be small is increased as the temperature difference is greater and as the position of the dot F is further on the rear side. With this, since the density is decreased further on the rear side of the image, thereby making is possible to uniformize the density in the front-rear direction of the image.

Note that also in the tenth modification and the twelfth modification, in a case that the discharge amount of each of the fifth dot and the sixth dot which are continuously arranged in the first direction is corrected, there is such a fear that a so-called white streak might appear since there is no other dot present between the fifth and sixth dots. According, as in the eighth modification, in the density correcting operation, the controller 50 corrects the discharge amount of the ink with respect to the seventh dot, rather than the fifth dot, so that the discharge amounts of the ink with respect to both of the fifth dot and the sixth dot are not corrected. With this, it is possible to lower any generation of the white streak, thereby making it possible to suppress any lowering of the image quality due to the white streak.

Thirteenth Modification

In a printing apparatus 10 according to a thirteenth modification, the printing operation includes a first mode, a second mode in which color development is heightened than in the first mode, and a third mode in which a consumption amount of the ink is lowered than in the first mode. The plurality of dots includes a third dot on the upstream in the first direction with respect to a predetermined position, and a fourth dot on the downstream in the first direction with respect to the predetermined position. In a case that the controller 50 performs the printing operation of the first mode, the controller 50 corrects, in the density correcting operation, the discharging amount of the ink with respect to the third dot so that a size of the third dot which corresponds to a ratio based on the temperature difference becomes greater than a size of the third dot based on the image data; and the controller 50 corrects, in the density correcting operation, the discharging amount of the ink with respect to the fourth dot so that a size of the fourth dot of which quantity corresponds to the ratio based on the temperature difference becomes to be smaller than the size of the fourth dot based on the image data. In a case that the controller 50 performs the printing operation of the second mode, the controller 50 corrects, in the density correction operation, the discharging amount of the ink with respect to the plurality of dots so that a size of the dot of which quantity corresponds to the ratio based on the temperature difference becomes greater than a size of the dot based on the image data. In a case that the controller 50 performs the printing operation of the third mode, the controller 50 corrects, in the density correction operation, the discharging amount of the ink with respect to the plurality of dots so that the size of the dot of which quantity corresponds to the ratio based on the temperature difference becomes to be smaller than a size of the dot based on the image data.

Specifically, in a case that the controller 50 executes the printing operation of the first mode in step S3 of FIG. 17A, in the density correcting operation, in step S42 of FIG. 17B, the controller 50 obtains a correction ratio based on the temperature difference for each of the nozzles 21, based on the predetermined corresponding relationship as depicted in the example of FIG. 21. Further, in the processing of step S43, the controller 50 corrects the discharge amount with respect to a nozzle 21, which is located on the front side in the front-rear direction with respect to the predetermined position, to be greater than the discharge amount based on the image data, in a similar manner as in the tenth modification. Furthermore, in the processing of step S43, the controller 50 corrects the discharge amount with respect to a nozzle 21, which is located on the rear side in the front-rear direction with respect to the predetermined position, to be smaller than the discharge amount based on the image data. With this, in the image, the size of a dot F on the front side with respect to the predetermined position is made to be great, and the ratio of the dot of which size is made to be great is greater as the temperature difference is greater and as the position of the dot F is further on the front side. Moreover, in the image, the size of a dot F on the rear side with respect to the predetermined position is made to be small, and the ratio of the dot of which size is made to be small is greater as the temperature difference is greater and as the position of the dot F is further on the rear side. With this, the density is increased further on the front side of the image, and the density is decreased further on the rear side in the image, thereby uniformizing the density in the front-rear direction of the image.

Further, in a case that the controller 50 executes the printing operation of the second mode in step S3 of FIG. 17A, and in the density correcting operation, in step S42 of FIG. 17B, the controller 50 obtains a correction ratio based on the temperature difference of the ink for each of the nozzles 21, based on the predetermined corresponding relationship as depicted in the example of FIG. 23. Furthermore, in the processing of step S43, similarly to the processing in the eleventh modification, the controller 50 corrects the discharge amount of the ink so that the discharge amount with respect to a dot, of which quantity corresponds to the correction ratio among the dots based on the image data, becomes greater than the discharge amount based on the image data. In such a manner, the size of a dot F which is located on the front side in the image is made to be great, and the ratio of the dot of which size is made to be great is increased as the temperature difference is greater and as the position of the dot F is further on the front side, while heightening the color development of the image. With this, since the density is increased further on the front side of the image, thereby making is possible to uniformize the density in the front-rear direction of the image.

Furthermore, in a case that the controller 50 executes the printing operation of the third mode in step S3 of FIG. 17A, and in the density correcting operation, in step S42 of FIG. 17B, the controller 50 obtains a correction ratio based on the temperature difference of the ink for each of the nozzles 21, based on the predetermined corresponding relationship as depicted in the example of FIG. 24. Moreover, in the processing of step S43, similarly to the processing in the twelfth modification, the controller 50 corrects the discharge amount of the ink so that the discharge amount with respect to a dot, of which quantity corresponds to the correction ratio among the dots based on the image data, to be smaller than the discharge amount based on the image data. In such a manner, the size of a dot F which is located on the rear side in the image is made to be small, and the ratio of the dot of which size is made to be small is increased as the temperature difference is greater and as the position of the dot F is further on the rear side, while reducing the consumption amount of the ink. With this, since the density is lowered further on the rear side of the image, thereby making is possible to uniformize the density in the front-rear direction of the image.

Fourteenth Modification

In a printing apparatus 10 according to a fourteenth modification, the print medium A includes a landing-possible area G1 in which the ink is allowed to land, and a mask area G0 in which the discharging amount of the ink is corrected to 0 in the density correcting operation. Here, in the print medium A, for example, a quantity of the mask area G0 is greater further on the downstream side in the first direction.

Specifically, in the density correcting operation of step S4 of FIG. 17A, in the step S41 of FIG. 17B, the controller 50 divides image data which is made to correspond to the print medium A into a plurality of areas (regions) G, as depicted in FIG. 25A, and the controller 50 obtains the discharge amount of the ink with respect to each of the divided areas G, based on the gradation. Further, the controller 50 obtains, with respect to each of the nozzles 21, the correction ratio of the discharge amount corresponding to the temperature difference of the ink in the manifold 22 and the order of the nozzle 21, from the predetermined corresponding relationship indicated in FIG. 15 (step S42).

Here, the controller 50 associates the orders of the areas G, of the image data, which are aligned in order from the front, and the orders of the nozzles 21 which are aligned in order from the front to the rear along the manifold 22. The controller 50 corrects the discharge amount of the ink to 0 from the discharge amount based on the image data, with respect to an area G included in the areas G, to each of which the ink is discharged from the nozzles 21, and corresponding to the correction ratio. With this, in an area row g in which the plurality of areas G are aligned in the left-right direction, an area G, included in areas G, for each of which the discharge amount is the small-sized droplet, the middle-sized droplet or the large-sized droplet, and corresponding to the correction ratio, is set as the mask area G0 of which discharge amount is corrected to 0. Further, the areas G which are different from the mask area G0 are each set as the landing-possible area G1.

Further, in the position correcting operation of step S2 of FIG. 17A, the controller 50 selects, among a plurality of waveform signals, a waveform signal in accordance with the corrected discharge amount and a waveform signal or signals in accordance with the discharge amount different from the corrected discharge amount so as to generate waveform selection data, and allocates the waveform selection data to each of the driving elements 24 and the driving timing. Furthermore, in the printing operation of step S3 of FIG. 17A, the controller 50 performs the correction so that the driving timing, as the discharge timing of the ink, is delayed with respect to the discharge timing of the ink based on the image data. Moreover, in the printing operation of step S3 of FIG. 17A, the controller 50 outputs control data in which the discharge amount of the ink and the discharge timing of the ink are corrected to each of the driving elements 24, via the head driving circuit 25. With this, the ink is discharged onto the print medium A by the driving of each of the driving elements 24, and as depicted in FIG. 25C, a dot F based on the image data is formed in each of the landing-possible areas G1, without forming the dot F based on the image data in each of the mask areas G0.

Further, the ratio of the mask area G0, in an area row g, in which the discharge amount is corrected to 0, is made to be greater in a case that the area row g is located further on the rear side among area rows g. With this, the ratio by which the dots F are not formed is increased in the area row g which is located further on the rear side. The quantity of the mask area G0 is greater as the temperature difference in the manifold 22 is greater, and the quantity of the mask area G0 is greater in an area row g which is located further on the rear side among area rows g. Accordingly, it is possible to lower the density at a rear part or portion of the image, thereby making is possible to uniformize the density in the front-rear direction of the image.

Note that also in the fourteenth modification, in a case that the mask area G0 is set in each of two areas which are arranged continuously in the first direction, there is such a fear that these two areas might appear as a so-called white streak since no dot is formed between the two areas. According, as in the eighth modification, in the density correcting operation, the controller 50 corrects the discharge amount of the ink with respect to the seventh dot, rather than the fifth dot, so that the discharge amounts of the ink with respect to both of the fifth dot and the sixth dot are not corrected. With this, the area G of the seventh dot is set as the mask area G0. Accordingly, it is possible to lower any generation of the white streak due to the mask area G0, thereby making it possible to suppress any lowering of the image quality due to the white streak.

Fifteenth Modification

A printing apparatus 10 according to a fifteenth modification is provided with a case 16 configured to accommodate the ink cartridge 12 and a second temperature sensor 17 configured to detect the environmental temperature in the inside of the case 16. The controller 50 corrects, in the density correcting operation, the discharge amount of the ink based on the environmental temperature detected by the second temperature sensor 17 and based on the temperature difference.

Specifically, as depicted in FIG. 1, the case 16 accommodates the ink cartridge 12. The second temperature sensor 17 detects the temperature inside the case 16 as the environmental temperature, and outputs the detected temperature to the controller 50. Since the temperature of the ink flowing into the manifold 22 depends on the environmental temperature, the size of the dot F is different depending also on the environmental temperature, as well as depending on the temperature different between a front part and a rear part in the manifold 22. Accordingly, the controller 50 obtains the temperature detected by the second temperature sensor 17 as the environmental temperature, and also obtains the temperature difference of the ink in the manifold 22 from the first temperature sensor 13.

The controller 50 obtains, with respect to each of the nozzles 21, the correction ratio of the discharge amount in accordance with the temperature difference of the ink, based on the predetermined corresponding relationship indicated in FIG. 15, FIG. 21, FIG. 23 or FIG. 24. Further, the controller 50 obtains a magnification in accordance with the environmental temperature, based on a table indicating a predetermined corresponding relationship between the environmental temperature and the magnification, as depicted in an example of FIG. 26. Furthermore, the controller 50 multiplies the correction ratio by the magnification so as to correct the correction ratio. In FIG. 26, since a change of viscosity with respect to the temperature difference is greater as the environmental temperature is lower, the magnification becomes greater which in turn makes the correction ratio which is amended (corrected) to be greater. The controller 50 corrects the discharge amount, with respect to a dot of which quantity corresponds to the corrected correction ratio among the dots based on the image data, from the discharge amount based on the image data. With this, since a reduction amount of the size or the quantity (number) of the dots F constructing an image becomes greater further on the rear side of the image, it is possible to reduce any unevenness in the density in the front-rear direction of the image.

Other Modifications

In all of the above-described embodiments and modifications, the first temperature sensor 13 has the upstream temperature sensor 13*a* and the downstream temperature sensor 13*b*, and the controller 50 obtains the difference between the detected temperatures by the upstream and downstream sensors 13*a* and 13*b*, as the temperature difference of the ink between the front part and the rear part in the manifold 22. Note, however, that the method of obtaining the temperature difference is not limited to or restricted by this. For example, the first temperature sensor 13 has a reference junction and a measuring contact of a thermocouple, and the reference junction is arranged in the vicinity of the upstream of the manifold 22, and the measuring contact is arranged in the vicinity of the downstream of the manifold 22. With this, the first temperature sensor 13 detects the temperature difference of the ink between the front part and the rear part in the manifold 22, and outputs the detected temperature difference to the controller 50.

In all of the above-described embodiments and modifications, the thermistor is used as the first temperature sensor 13, the first temperature sensor 13 is not limited to this. For example, in a case that the driving elements 24 are arranged at a location above or in the vicinity of the manifold 22, the current of the driving elements 24 due to the residual vibration, and the electric capacitance of the driving elements 24 depend on the temperature of the ink in the manifold 22. Accordingly, a sensor configured to detect the current of the driving elements 24 due to the residual vibration, and a sensor configured to detect the electric capacitance of the driving elements 24 are used as the first temperature sensor 13.

Specifically, the driving elements 24 are driven to thereby supply a pressure wave to the ink, to discharge the ink from the nozzles 21 and/or to vibrate the meniscus formed in the nozzles 21. In case that the pressure wave discharges the ink from the nozzles 21 and/or vibrates the meniscus formed in the nozzles 21, the pressure wave does not disappear at once, rather remains in the ink as the residual vibration. This residual vibration deforms a driving element 24 which stands still (which is at rest), and generates a current from the driving element 24. The current generated by the residual vibration and the amplitude of the residual vibration of the ink have a predetermined corresponding relationship. Further, since the amplitude of the residual vibration of the ink depends on the viscosity of the ink, and the viscosity of the ink depends on the temperature of the ink, the amplitude of the residual vibration and the temperature of the ink have a predetermined corresponding relationship. Accordingly, it is possible to obtain the temperature of the ink from the current of the driving elements 24 based on a table indicating the predetermined corresponding relationship between the current of the driving elements 24 generated by the residual vibration and the temperature of the ink, and thus the sensor configured to detect the current of the driving elements 24 by the residual vibration is used as the first temperature sensor.

Further, the driving elements 24 are arranged via a vibration plate (not depicted in the drawings) interposed between the driving elements 24 and the individual channels 23. Since the thickness of the vibration plate is in a range of several μm to several tens μm which is thin, and/or the material of the vibration plate is a metal such as SUS, etc., and has the thermal conductivity, the heat of the ink flowing through the individual channels 23 is transmitted to the driving elements 24 via the vibration plate. Further, in a case that the driving elements 24 are piezoelectric, the electric capacitance of the driving elements 24 are affected by the temperature of the ink flowing through the individual channels 23. Namely, the electric capacitance of the driving elements 24 depends on the temperature of the ink in the manifold 22. Accordingly, since it is possible to obtain the temperature of the ink from the electric capacitance of the driving elements 24 based on a table indicating a predetermined corresponding relationship between the electric capacitance of the driving elements 24 and the temperature of the ink in the manifold 22, the sensor which configured to detect the electric capacitance of the driving elements 24 in a case that the driving elements 24 are being driven is used as the first temperature sensor 13.

Note that the above-described embodiments and the respective modifications may be combined with each other as long as they are not mutually exclusive. Further, from the above-described explanation, numerous improvements and/or other embodiments of the present disclosure will be apparent to those skilled in the art. Accordingly, the foregoing explanation should be interpreted as a mere example, and as being provided for the purpose of providing, to those skilled in the art, the best mode for carrying out the present disclosure. The configuration and/or the detailed function of the present disclosure may be substantially changed, without departing from the spirit of the present disclosure.

What is claimed is:

1. A printing apparatus comprising:

a head including a plurality of nozzles aligned in a first direction, a manifold containing ink communicating with the plurality of nozzles;

a first temperature sensor for detecting, in the manifold, a temperature difference between a temperature of the ink at an upstream end of the manifold in the first direction and a temperature of the ink at a downstream end of the manifold in the first direction; and a controller, wherein the plurality of nozzles includes a first nozzle arranged at the upstream in the first direction, and a second nozzle arranged at the downstream in the first direction, and the controller is configured to execute:

causing of the head to perform printing of discharging the ink from the plurality of nozzles onto a print medium, based on image data, so as to form an image by the ink landed on the print medium; and performing of position correction of correcting a discharge timing of the ink from the plurality of nozzles based on the temperature difference so that a distance between a landing position of the ink discharged from the first nozzle and a landing position of the ink discharged from the second nozzle becomes short in a second direction crossing the first direction.

2. The printing apparatus according to claim 1, further comprising a carriage configured to move the head in a forwarding route and a returning route in the second direction, wherein in a case that the controller causes the head to perform the printing, the controller is configured to alternately execute a forwarding route-pass of discharging the ink from the plurality of nozzles while moving the head in the forwarding route, and a returning route-pass of discharging the ink from the plurality of nozzles while moving the head in the returning route, and in a case that the controller performs the position correction, the controller is configured to perform correction so that, regarding the forwarding route-pass and the returning route-pass, the discharge timing of the ink, in one of the forwarding-route pass, the returning route-pass, or both of the forwarding route-pass and the returning route-pass, is delayed with respect to the discharge timing of the ink based on the image data.

3. The printing apparatus according to claim 2, wherein in the case that the controller performs the position correction, the controller is configured to perform the correction so that the discharge timing of the ink in the returning route-pass is delayed with respect to the discharge timing of the ink based on the image data, without correcting the discharge timing of the ink in the forwarding route-pass.

4. The printing apparatus according to claim 2, wherein the returning route-pass is executed as a next pass to the forwarding route-pass, the landing position of the ink includes: a first landing position of the ink from the first nozzle in the returning route-pass; a second landing position of the ink from the first nozzle in the forwarding route-pass; and a third landing position of the ink from the second nozzle in the forwarding route-pass, in the case that the controller performs the position correction and that the temperature difference is a first temperature difference, the controller is configured to perform correction of delaying the discharge timing of the ink in the returning route-pass with respect to the discharge timing of the ink based on the image data so that the first landing position is arranged, in the second direction, to be more distant from the second landing position than the third landing position, and in the case that the controller performs the position correction and that the temperature difference is a second temperature difference being greater than the first temperature difference, the controller is configured to perform correction of delaying the discharge timing of the ink in the returning route-pass with respect to the discharge timing of the ink based on the image data so that the first landing position is arranged, in the second direction, to be nearer to the second landing position than the third landing position.

5. The printing apparatus according to claim 1, further comprising: a case configured to accommodate an ink cartridge; and a second temperature sensor configured to detect an environmental temperature inside the case, wherein in the case that the controller performs the position correction, the controller is configured to correct the discharge timing of the ink based on the temperature difference and the environmental temperature.

6. The printing apparatus according to claim 1, wherein the image is constructed of a plurality of dots, and the controller is configured to execute density correction of correcting, based on the temperature difference, a discharging amount of the ink based on the image data and with respect to the plurality of dots so that a density difference between densities in the first direction of the image becomes to be small.

7. The printing apparatus according to claim 6, wherein in a case that the controller performs the density correction, the controller is configured to correct the discharging amount of the ink to be zero with respect to a dot or dots among the plurality of the dots, wherein quantity of the dot or dots among the plurality of dots corresponds to a ratio based on the temperature difference.

8. The printing apparatus according to claim 7, wherein the plurality of dots includes a first dot and a second dot, a size of the second dot being greater than a size of the first dot, and in the case that the controller performs the density correction, the controller is configured to correct the discharging amount of the ink to be zero with respect to the dot or dots among all the plurality of dots including the first dot and the second dot, wherein quantity of the dot or dots among all the plurality of dots corresponds to the ratio based on the temperature difference.

9. The printing apparatus according to claim 7, wherein the plurality of dots includes a plurality of first dots and a plurality of second dots, a size of the plurality of second dots being greater than a size of the plurality of first dots; and in the case that the controller performs the density correction, the controller is configured to:

correct the discharging amount of the ink to be zero with respect to a first dot or first dots among the plurality of first dots, wherein quantity of the first dot or first dots corresponds to the ratio based on the temperature difference; and correct the discharging amount of the ink to be zero with respect to a second dot or second dots among the plurality of second dots, wherein quantity of the second dot or second dots corresponds to the ratio based on the temperature difference.

10. The printing apparatus according to claim 6, wherein the plurality of dots includes a plurality of third dots located on the upstream in the first direction with respect to a predetermined position, and a plurality of fourth dots located on the downstream in the first direction with respect to the predetermined position, in the case that the controller performs the density correction, the controller is configured to:

correct the discharging amount of the ink with respect to the plurality of third dots so that a size of a third dot or third dots among the plurality of third dots becomes greater than a size of the plurality of dots based on the image data, wherein quantity of the third dot or third dots among the plurality of the third dots corresponds to a ratio based on the temperature difference; and correct the discharging amount of the ink with respect to the plurality of fourth dots so that a size of a fourth dot or fourth dots among the plurality of fourth dots becomes to be smaller than the size of the plurality of dots based on the image data, wherein quantity of the fourth dot or fourth dots among the plurality of the fourth dots corresponds to a ratio based on the temperature difference.

11. The printing apparatus according to claim 6, wherein in the case that the controller performs the density correction, the controller is configured to correct the discharging amount of the ink with respect to the plurality of dots so that a size of the dot or dots among the plurality of dots becomes greater than a size of the plurality of dots based on the image data, wherein quantity of the dot or dots among the plurality of dots corresponds to a ratio based on the temperature difference.

12. The printing apparatus according to claim 6, wherein in the case that the controller performs the density correction, the controller is configured to correct the discharging amount of the ink with respect to the plurality of dots so that a size of the dot or dots among the plurality of dots becomes smaller than a size of the plurality of dots based on the image data, wherein quantity of the dot or dots among the plurality of dots corresponds to a ratio based on the temperature difference.

13. The printing apparatus according to claim 6, wherein the printing includes a first mode, a second mode, and a third mode, wherein color development in the second mode is heightened than in the first mode, and a consumption amount of the ink in the third mode is lowered than in the first mode;

the plurality of dots includes a plurality of third dots on the upstream in the first direction with respect to a predetermined position, and a plurality of fourth dots on the downstream in the first direction with respect to the predetermined position, in the case that the controller performs the density correction and that the controller performs the printing of the first mode, the controller is configured to correct the discharging amount of the ink with respect to the plurality of third dots so that a size of a third dot or third dots among the plurality of third dots becomes greater than a size of the plurality of dots based on the image data, wherein quantity of the third dot or third dots among the plurality of third dots corresponds to a ratio based on the temperature difference, and the controller is configured to correct the discharging amount of the ink with respect to the plurality of fourth dots so that a size of a fourth dot or fourth dots among the plurality of fourth dots becomes to be smaller than the size of the plurality of fourth dot based on the image data, wherein quantity of the fourth dot or fourth dots among the plurality of fourth dots corresponds to a ratio based on the temperature difference, in the case that the controller performs the density correction and that the controller performs the printing of the second mode, the controller is configured to correct the discharging amount of the ink with respect to the plurality of dots so that a size of the dot or dots among the plurality of dots becomes greater than a size of the plurality of dots based on the image data, wherein quantity of the dot or dots among the plurality of dots corresponds to a ratio based on the temperature difference, and in the case that the controller performs the density correction and that the controller performs the printing of the third mode, the controller is configured to correct the discharging amount of the ink with respect to the plurality of dots so that the size of the dot or dots among the plurality of dots becomes to be smaller than a size of the plurality of dots based on the image data, wherein quantity of the dot or dots among the plurality of dots corresponds to a ratio based on the temperature difference.

14. The printing apparatus according to claim 7, wherein the print medium includes a landing-possible area and a mask area, wherein the ink is land in the landing-possible area, and the discharging amount of the ink is corrected to zero in the density correction in the mask area.

15. The printing apparatus according to claim 14, wherein a quantity of the mask area becomes greater further on the downstream in the first direction in the print medium.

16. The printing apparatus according to claim 6, wherein the plurality of dots includes a fifth dot and a sixth dot arranged side by side continuously in the first direction, and a seventh dot arranged side by side with respect to the fifth dot continuously in the second direction, and in the case that the controller performs the density correction, the controller is configured to correct the discharging amount of the ink with respect to the seventh dot, rather than correcting the discharging amount of the ink with respect to the fifth dot, so that the discharging amount of the ink is not corrected with respect to both of the fifth dot and the sixth dot.

17. The printing apparatus according to claim 6, wherein the plurality of dots includes an eighth dot, a nineth dot and a tenth dot arranged side by side continuously in the second direction, and in the case that the controller performs the density correction, the controller is configured to correct the discharging amount of the ink with respect to the tenth dot, rather than correcting the discharging amount of the ink with respect to the nineth dot, so that the discharging amount of the ink is not corrected with respect to both of the eighth dot and the nineth dot.

18. The printing apparatus according to claim 6, further comprising a case configured to accommodate an ink cartridge; and a second temperature sensor configured to detect an environmental temperature inside the case, wherein wherein in the case that the controller performs the density correction, the controller is configured to correct the discharge amount of the ink based on the environmental temperature detected by the second temperature sensor and based on the temperature difference.

19. A printing method for a printing apparatus, the printing apparatus including:

a head including a plurality of nozzles aligned in a first direction; a manifold containing ink communicating with the plurality of nozzles; and a first temperature sensor for detecting, in the manifold, a temperature difference between a temperature of the ink at an upstream end of the manifold in the first direction and a temperature of the ink at a downstream end of then manifold in the first direction, wherein the plurality of nozzles includes a first nozzle arranged at the upstream in the first direction, and a second nozzle arranged at the downstream in the first direction, the printing method comprising:

discharging of the ink from the plurality of nozzles onto a print medium, based on image data, so as to form an image by the ink landed on the print medium; and correcting of a discharge timing of the ink from the plurality of nozzles based on the temperature difference so that a distance between a landing position of the ink discharged from the first nozzle and a landing position of the ink discharged from the second nozzle becomes short in a second direction crossing the first direction.

20. A non-transitory, computer-readable medium storing a program for controlling a printing apparatus, the printing apparatus including:

a head including a plurality of nozzles aligned in a first direction, a manifold communicating with the plurality of nozzles; and a first temperature sensor for detecting, in the manifold, a temperature difference between a temperature of the ink at upstream in the first direction and a temperature of the ink at a downstream in the first direction, wherein the plurality of nozzles includes a first nozzle arranged at the upstream in the first direction, and a second nozzle arranged at the downstream in the first direction, the program causing a computer of the printing apparatus to execute:

discharging of the ink from the plurality of nozzles onto a print medium, based on image data, so as to form an image by the ink landed on the print medium; and correcting of a discharge timing of the ink from the plurality of nozzles based on the temperature difference so that a distance between a landing position of the ink discharged from the first nozzle and a landing position of the ink discharged from the second nozzle becomes short in a second direction crossing the first direction.

* * * * *